US012797905B2

(12) United States Patent
Takasugi

(10) Patent No.: US 12,797,905 B2
(45) Date of Patent: Nov. 17, 2026

(54) ULTRASONIC TRANSDUCER ARRAY AND ULTRASONIC PHASED ARRAY SENSOR

(71) Applicant: Suncall Corporation, Kyoto (JP)

(72) Inventor: Satoru Takasugi, Kyoto (JP)

(73) Assignee: Suncall Corporation, Kyoto (JP)

( * ) Notice: Subject to any disclaimer, the term of this patent is extended or adjusted under 35 U.S.C. 154(b) by 0 days.

(21) Appl. No.: 19/112,942

(22) PCT Filed: Dec. 8, 2022

(86) PCT No.: PCT/JP2022/045251
§ 371 (c)(1),
(2) Date: Mar. 18, 2025

(87) PCT Pub. No.: WO2024/122021
PCT Pub. Date: Jun. 13, 2024

(65) Prior Publication Data

US 2026/0097418 A1 Apr. 9, 2026

(51) Int. Cl.
*B06B 1/06* (2006.01)
*G01S 7/524* (2006.01)
*G01S 15/931* (2020.01)

(52) U.S. Cl.
CPC ............ *B06B 1/0622* (2013.01); *G01S 7/524* (2013.01); *G01S 15/931* (2013.01)

(58) Field of Classification Search
CPC ..... B06B 1/0622; G01S 7/524; G01S 15/931; H04R 17/00
See application file for complete search history.

(56) References Cited

U.S. PATENT DOCUMENTS 4,414,482 A * 11/1983 Lewis .................. A61M 16/20 310/334
2021/0220874 A1* 7/2021 Kojima ................ B06B 1/0622

FOREIGN PATENT DOCUMENTS

JP 57-197995 A1 12/1982
JP 02-102481 A1 4/1990
(Continued)

OTHER PUBLICATIONS

International Search Report issued in International Application No. PCT/JP2022/045251, mailed Jun. 12, 2023, 3 pages.

*Primary Examiner* — Quan Zhen Wang
*Assistant Examiner* — Rajsheed O Black-Childress
(74) *Attorney, Agent, or Firm* — Sterne, Kessler, Goldstein & Fox P.L.L.C.

(57) ABSTRACT

An ultrasonic transducer array of this invention includes a rigid support plate with a through-hole group including through-holes, a flexible resin film fixed to the support plate so as to cover the through-holes, and piezoelectric elements fixed to the flexible resin film so that middle portions overlap the corresponding through-holes and peripheral portions overlap the support plate, wherein the piezoelectric elements include transmission piezoelectric elements forming transmission transducers that generate ultrasonic waves in response to driving voltage signal having a predetermined driving frequency and one or plural reception piezoelectric elements forming one or plural reception transducers that generate reception voltage signals in response to ultrasonic waves, and wherein the transmission transducer is of a non-resonant type that generates ultrasonic wave without resonant vibration in response to the driving voltage signal and the reception transducer is of a resonant type that performs resonant vibration in response to ultrasonic wave having a frequency corresponding to the driving frequency.

18 Claims, 19 Drawing Sheets

(56) References Cited

FOREIGN PATENT DOCUMENTS

| | | | |
|---|---|---|---|
| JP | 11248821 | A1 | 9/1999 |
| JP | 2005-117159 | A1 | 4/2005 |
| JP | 6776481 | B1 | 10/2020 |
| JP | 2021-114746 | A1 | 8/2021 |
| JP | 7023436 | B1 | 2/2022 |

* cited by examiner

ULTRASONIC TRANSDUCER ARRAY AND ULTRASONIC PHASED ARRAY SENSOR

FIELD OF THE INVENTION

The present invention relates to an ultrasonic transducer array and a phased array sensor including the array.

BACKGROUND ART

There are proposed ultrasonic transducer arrays including a transmission transducer row in which a plurality of transmission transducers are linearly arranged at regular intervals and a reception transducer row in which a plurality of reception transducers are linearly arranged at regular intervals, wherein the transmission transducer row and the reception transducer row are not intersected with each other and are arranged so that their inclination angle is a right angle (see Patent Literatures 1 and 2 below).

In the ultrasonic transducer array, a driving voltage including a predetermined driving frequency component is sequentially applied to the plurality of transmission ultrasonic transducers with a certain phase difference, and the transmission transducer row radiates ultrasonic waves at an azimuth angle corresponding to the phase difference.

On the other hand, the plurality of reception ultrasonic transducers receive ultrasonic waves (received ultrasonic waves) that are radiated by the transmission transducer array and then reflected back from an obstacle, and generate received voltage signals.

The received voltage signals generated by the plurality of reception ultrasonic transducers are sequentially delayed by predetermined time and added. Herein, the delay time for the received voltage signal is set so as to add a received voltage signal based on a received sonic wave from the same azimuth angle as the azimuth angle of the radiated sonic wave.

However, a conventional ultrasonic transducer array has the following problems.

In order to cause the transmission ultrasonic transducers to resonate with a sufficiently large, it is general to resonate the transmission ultrasonic transducers.

Specifically, a driving voltage signal whose main component is the resonant frequency of the transmission ultrasonic transducer, preferably a burst wave driving voltage signal is applied to each of the transmission ultrasonic transducers, so that the transmission ultrasonic transducers are caused to resonate and emit ultrasonic waves.

In this case, when the driving voltage signal is applied, sonic waves of a resonant frequency are emitted from the transmission ultrasonic transducers, and the transmission ultrasonic transducers perform damping vibration at the resonant frequency for a certain period of time after application of the driving voltage signal (the burst wave driving voltage signal in a preferable configuration) is terminated.

Therefore, in a case where a plurality of obstacle are located close to one another, a reflected sonic wave that the reception ultrasonic transducer receives as a reflected sonic wave from a first obstacle located closest to the reception ultrasonic transducers includes a reflected sonic wave of a radiated sonic wave (hereinafter referred to as normal radiated sonic wave) that is radiated by the transmission ultrasonic transducers in response to the driving voltage signal and a reflected sonic wave of a radiated sonic wave (hereinafter referred to as damping radiated sonic wave) that is radiated by the transmission ultrasonic transducers in response to the damping vibration.

In such a case, the reception ultrasonic transducer may receive a reflected sonic wave in which a reflected sonic wave caused by the normal radiated sonic wave reflected back from a second obstacle located farther away than the first obstacle is overlapped with a reflected sonic wave caused by the damping radiated sonic wave reflected back from the first obstacle. This situation decreases the distance resolution of obstacle detection.

Moreover, a phase of a frequency response in the vibration mode of the transmission transducer with respect to the voltage applied to the transmission transducer changes largely in the vicinity of the resonance frequency of the transmission transducer.

Therefore, in order to precisely control the phase of the sonic waves radiated by the plurality of transmission transducers while setting the frequency of the driving voltage applied to the plurality of transmission transducers near the resonant frequency of the transmission transducers, it is necessary to suppress as much as possible "dispersion" in the resonance frequency among the plurality of transmission transducers, which is very difficult.

An applicant of the present application filed a patent application for an invention relating to a non-resonant ultrasonic transducer, which is different from the non-resonant ultrasonic transducer described above, and has obtained a patent for the invention (see Patent Literatures 3 and 4 below).

The non-resonant ultrasonic transducer is configured so that the resonant frequency is higher than the driving frequency (e.g., 40 kHz), whereby the phase of vibration at the driving frequency can be precisely controlled without being affected by fluctuation in the resonant frequency.

However, if the non-resonant ultrasonic transducer is used as the reception transducer, an output voltage excited in response to the reception of the reflected sonic waves becomes lower, whereby it becomes difficult to precisely separate received voltage signals corresponding to the reflected sonic waves from various noise components.

PRIOR ART DOCUMENT

Patent Literature

Patent Literature 1: Japanese Patent Publication No. H02-102481

Patent Literature 2: Japanese Patent Publication No. H11-248821

Patent Literature 3: Japanese Patent No. 6776481

Patent Literature 4: Japanese Patent No. 7023436

SUMMARY OF THE INVENTION

The present invention has been made in consideration of the conventional technology, and it is a first object to provide an ultrasonic transducer array including a plurality of transmission transducers and one or a plurality of receipt transducers, the ultrasonic transducer array capable of causing the reception transducer to generate a sufficiently large reception voltage signal in response to reception of an reflected ultrasonic wave while improving phase control characteristics of sonic waves radiated from the plurality of transmission transducers.

Furthermore, it is a second object to provide a phased array sensor including the ultrasonic transducer array.

In order to achieve the first object, a first aspect of the present invention provides a ultrasonic transducer array including a rigid support plate having a first surface on one side and a second surface on the other side in a thickness direction, the rigid support plate being provided with a through-hole group including a plurality of through-holes penetrating between the first and second surfaces; a flexible resin film fixed to the first surface of the support plate in such a way as to cover the plurality of through-holes; and a plurality of piezoelectric elements whose number is same as a number of the plurality of through-holes, the piezoelectric element being fixed to the flexible resin film in such a way that a middle portion thereof overlaps, in a plan view, the corresponding through-hole and a peripheral portion thereof overlaps, in a plan view, the first surface of the support plate, wherein the plurality of piezoelectric elements include a plurality of transmission piezoelectric elements forming transmission transducers that generate ultrasonic waves in response to application of a driving voltage signal having a predetermined driving frequency, and one or a plurality of reception piezoelectric elements forming one or a plurality of reception transducers that generate reception voltage signals in response to reception of ultrasonic waves, and wherein the transmission transducer is of a non-resonant type that generates ultrasonic wave without performing resonant vibration in response to application of the driving voltage signal having the predetermined driving frequency, and the reception transducer is of a resonant type that performs resonant vibration in response to receipt of ultrasonic wave having a frequency corresponding to the driving frequency.

According to the ultrasonic transducer array of the first aspect of the present invention, it is possible that the reception transducer generates a sufficiently large reception voltage signal in response to reception of an reflected ultrasonic wave while improving phase control characteristics of sonic waves radiated from the plurality of transmission transducers.

In a first embodiment of the first aspect, the through-hole group may have an X-direction row formed by m (m is an integer of 3 or higher) pieces of the through-holes that are arranged at a predetermined X-direction array pitch in an X-direction in an X-Y plane of the support plate.

In a preferable configuration of the first embodiment, the through-hole group includes a reference X-direction row, and one or a plurality of parallel X-direction rows arranged in a Y-direction of the reference X-direction row at a predetermined Y-direction array pitch, wherein the one or the plurality of reception piezoelectric elements are arranged so as to cover, in a plan view, one or a plurality of through-holes forming the reference X-direction row, and wherein a transmission piezoelectric element, out of the plurality of transmission piezoelectric elements, that is adjacent to the receipt piezoelectric element in the Y-direction is thinner than another transmission piezoelectric elements.

In a more preferable configuration, the parallel X-direction rows include first and second adjacent X-direction rows that are adjacent to the reference X-direction row on one side and the other side in the Y-direction of the reference X-direction row, respectively, at the predetermined Y-direction array pitch. Transmission piezoelectric elements, out of the plurality of transmission piezoelectric elements, that are adjacent to the receipt piezoelectric element on one side and the other side in the Y-direction are thinner than another transmission piezoelectric elements.

The X-direction array pitch and the Y-direction array pitch are preferably same to each other.

In any one of the above various configurations, the reception piezoelectric element is preferably arranged so as to be symmetrical with respect to a center in the X-direction of the X-direction row.

In any one of the above various configurations, the thorough-hole may be preferably configured to include a recess opened to the first surface of the support plate and a waveguide having a first end on one end side that has an opening width smaller than the recess and is opened to a bottom surface of the recess and a second end on the other end side that is opened to the second surface of the support plate.

In a more preferable configuration, the waveguide includes a tubular portion having the first end that is opened to the bottom surface of the recess and a horn portion having the second end that is opened to the second surface of the support plate.

The tubular portion is configured to have an opening width that is smaller than that of the recess and is constant throughout a thickness direction, and the horn portion is configured to have an opening width that increases as being close to a distal end side opened to the second surface of the support plate from a proximal end side connected to the tubular portion.

In a preferable configuration of the above various configurations, the transmission piezoelectric element is configured to be of a multilayer laminated type and the reception piezoelectric element is configured to be of a single-layer type.

In a preferable configuration of the above various configurations, the reception piezoelectric element is configured to be thinner than the transmission piezoelectric element.

The ultrasonic transducer array according to the first aspect of the present invention may further include a lower sealing plate that is thicker than the transmission piezoelectric elements and has a plurality of piezoelectric-element-directed openings each having size sufficient to surround a corresponding one of the plurality of piezoelectric elements, the lower sealing plate being fixed to the flexible resin film so that the plurality of piezoelectric elements are located within the respective piezoelectric-element-directed openings in a plan view, and a wiring assembly fixed to the lower sealing plate.

The wiring assembly is configured to have an insulating base layer, a conductive layer including a transmission wiring and a reception wiring provided on the base layer, and an insulating cover layer surrounding the conductive layer. The base layer is formed with a transmission connection opening exposing a connection region of the transmission wiring that is connected to an electrode of the transmission piezoelectric element, and a reception connection opening exposing a connection region of the reception wiring that is connected to an electrode of the reception piezoelectric element.

In a case where the reception piezoelectric element is thinner than the transmission piezoelectric element, the connection region of the reception wiring is preferably provided with a bump extending outward trough the reception connection opening.

In order to achieve the second object, a second aspect of the present invention provides an ultrasonic phased array sensor including an ultrasonic transducer array including a rigid support plate that has a first surface on one side and a second surface on the other side in a thickness direction, the rigid support plate being provided with a through-hole group including a plurality of through-holes penetrating between the first and second surfaces, a flexible resin film that is fixed to the first surface of the support plate in such a way as to cover the plurality of through-holes, and a plurality of piezoelectric elements whose number is same as a number of the plurality of through-holes, the piezoelectric element being fixed to the flexible resin film in such a way that a middle portion thereof overlaps, in a plan view, the corresponding through-hole and a peripheral portion thereof overlaps, in a plan view, the first surface of the support plate, wherein the through-hole group has an X-direction row formed by m (m is an integer of 3 or higher) pieces of the through-holes that are arranged at a predetermined X-direction array pitch in an X-direction in an X-Y plane of the support plate, wherein the plurality of piezoelectric elements include a plurality of transmission piezoelectric elements forming transmission transducers that generate ultrasonic waves in response to application of a driving voltage signal having a predetermined driving frequency and a plurality of reception piezoelectric elements forming a plurality of reception transducers that generate reception voltage signals in response to reception of ultrasonic waves; a transmission signal generation device that generates sine burst wave driving voltage signals for applying the plurality of transmission piezoelectric elements at delay times respectively corresponding to the plurality of transmission piezoelectric elements, the driving voltage signal having the predetermined driving frequency lower than a resonance frequency of the transmission transducer; a plurality of detectors that generate detecting signals with widths corresponding to durations of the reception voltage signals respectively generated by the plurality of the reception piezoelectric elements; a plurality of delay circuits capable of delaying the reception voltage signals, which are respectively generated by the plurality of detectors, by respective predetermined times; an adder circuit that adds output signals of the plurality of delay circuits and outputs an added reception voltage signal; a control device that performs control with respect to the transmission signal generation device and the delay circuits; and a detection device that identifies a position of an obstacle on the basis of a time difference between a transmission timing signal based on the driving voltage signal sent from the control device and a reception timing signal based on the added reception voltage signal sent from the adder circuit, and an azimuth angle sent from the control device, wherein the transmission transducer is of a non-resonant type that generates an ultrasonic wave without performing resonant vibration in response to application of the driving voltage signal having the driving frequency, and the reception transducer is of a resonant type that performs resonant vibration in response to receipt of ultrasonic wave having a frequency corresponding to the driving frequency.

In a preferable configuration of the second aspect, the through-hole group includes a reference X-direction row, and one or a plurality of X-direction rows arranged in the Y-direction of the reference X-direction row at a predetermined Y-direction array pitch, the plurality of reception piezoelectric elements are arranged so as to cover, in a plan view, corresponding through-holes out of the plurality of through-holes forming the reference X-direction row, and the transmission signal generation device is configured to make an amplitude of the driving voltage signal applied to the transmission piezoelectric elements, out of plurality of the transmission piezoelectric elements, that are adjacent to the reception piezoelectric element in Y-direction larger than that of the driving voltage signal applied to the remaining transmission piezoelectric elements.

In a more preferable configuration, the through-hole group includes include first and second adjacent X-direction rows that are adjacent to the reference X-direction row on one side and the other side in the Y-direction of the reference X-direction row, respectively, at the predetermined Y-direction array pitch, and the transmission signal generation device is configured to make an amplitude of the driving voltage signal applied to the transmission piezoelectric elements, out of the transmission piezoelectric elements, that are adjacent to the reception piezoelectric element on one side and the other side in the Y-direction larger than that of the driving voltage signal applied to the remaining transmission piezoelectric elements.

In any one of the above various configurations of the second aspect, the plurality of reception piezoelectric elements are preferably arranged so as to cover, in a plan view, the through-holes at ends on one side and the other side in the X-direction of the reference X-direction row.

In any one of the above various configurations of the second aspect, the through-hole group includes a reference X-direction row, and one or a plurality of X-direction rows arranged in the Y-direction of the reference X-direction row at a Y-direction array pitch Py, wherein the plurality of reception piezoelectric elements are arranged so as to cover, in a plan view, corresponding through-holes, out of the plurality of through-holes, that form the reference X-direction row.

In a first embodiment of the second aspect, the transmission signal generation device includes a plurality of signal generating means respectively provided for the plurality of transmission piezoelectric elements.

In a second embodiment of the second aspect, the transmission signal generation device includes a plurality of signal generating means provided for every group of the transmission piezoelectric elements that are arranged at the same position in the X-direction, and the driving voltage signals from a common signal generating means are supplied to the group of the transmission piezoelectric elements that are arranged at the same position in the X-direction.

In order to achieve the second object, a third aspect of the present invention provides an ultrasonic phased array sensor including an ultrasonic transducer array including a rigid support plate that has a first surface on one side and a second surface on the other side in a thickness direction, the rigid support plate being provided with a through-hole group including a plurality of through-holes penetrating between the first and second surfaces, a flexible resin film that is fixed to the first surface of the support plate in such a way as to cover the plurality of through-holes, and a plurality of piezoelectric elements whose number is same as a number of the plurality of through-holes, the piezoelectric element being fixed to the flexible resin film in such a way that a middle portion thereof overlaps, in a plan view, the corresponding through-hole and a peripheral portion thereof overlaps, in a plan view, the first surface of the support plate, wherein the through-hole group has an X-direction row formed by m (m is an integer of 3 or higher) pieces of the through-holes that are arranged at a predetermined X-direction array pitch in an X-direction in an X-Y plane of the support plate, wherein the plurality of piezoelectric elements include a plurality of transmission piezoelectric elements forming transmission transducers that generate ultrasonic waves in response to application of a driving voltage signal having a predetermined driving frequency and a single reception piezoelectric element forming a reception transducer that generates a reception voltage signal in response to a reception of ultrasonic wave; a transmission signal generation device that generates sine burst wave driving voltage signals for applying the plurality of transmission piezoelectric elements at delay times respectively corresponding to the plurality of transmission piezoelectric elements, the driving voltage signal having the predetermined driving frequency lower than a resonance frequency of the transmission transducer; a detector that generates a detecting signal with a width corresponding to a duration of the reception voltage signal generated by the reception piezoelectric element; a control device that performs control with respect to the transmission signal generation device; and a detection device that identifies a position of an obstacle on the basis of a time difference between a transmission timing signal based on the driving voltage signal sent from the control device and a reception timing signal based on the detecting signal sent from the detector, and an azimuth angle sent from the control device, wherein the transmission transducer is of a non-resonant type that generates an ultrasonic wave without performing resonant vibration in response to application of the driving voltage signal having the driving frequency, and the reception transducer is of a resonant type that performs resonant vibration in response to receipt of an ultrasonic wave having a frequency corresponding to the driving frequency.

EMBODIMENT FOR CARRYING OUT THE INVENTION

First Embodiment

Hereinafter, one embodiment of an ultrasonic transducer array according to the present invention will be described with reference to the accompanying drawings.

Figure 1:
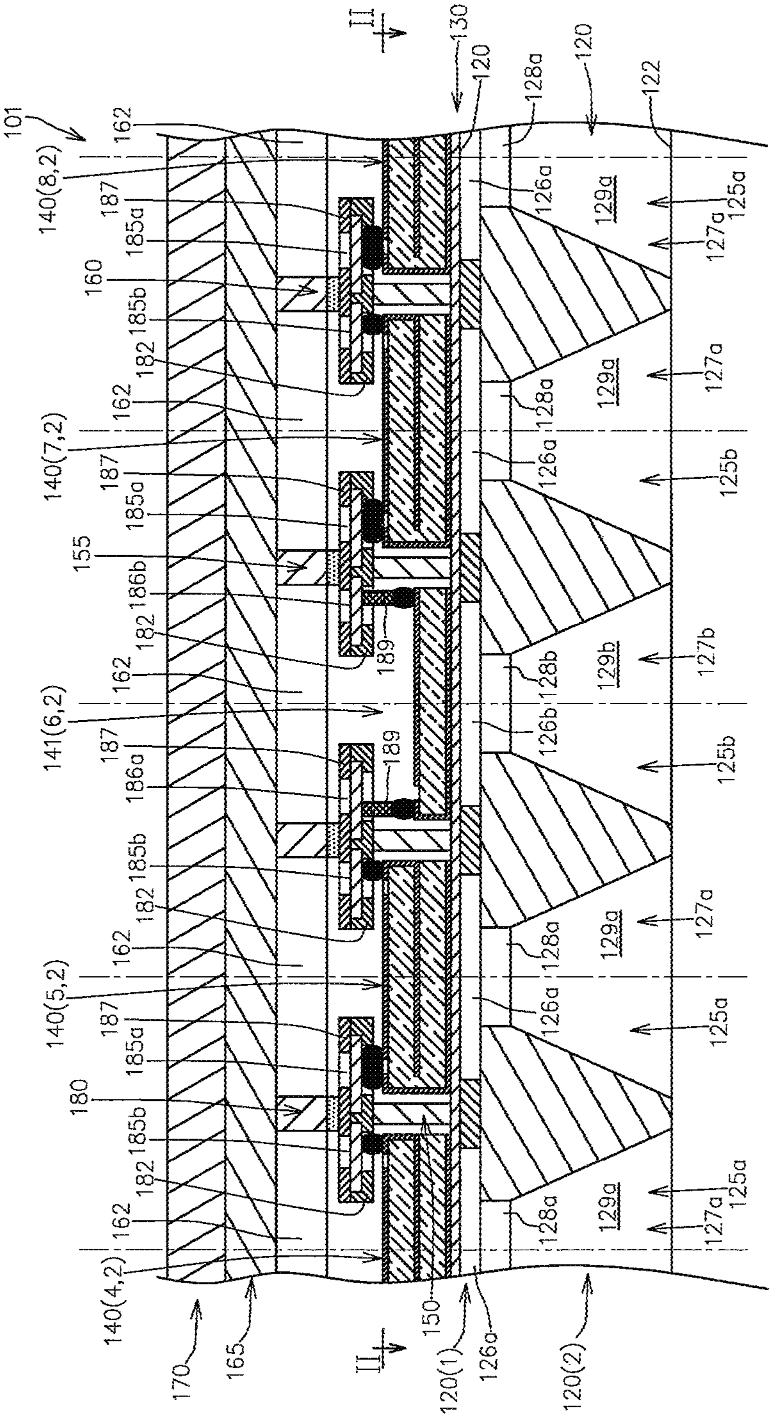
FIG. 1 is a vertically cross-sectional view of a part of an ultrasonic transducer array according to a first embodiment of the present invention.

FIG. 1 illustrates a vertically cross-sectional view of a part of an ultrasonic transducer array 101 according to the present embodiment.

Figure 2:
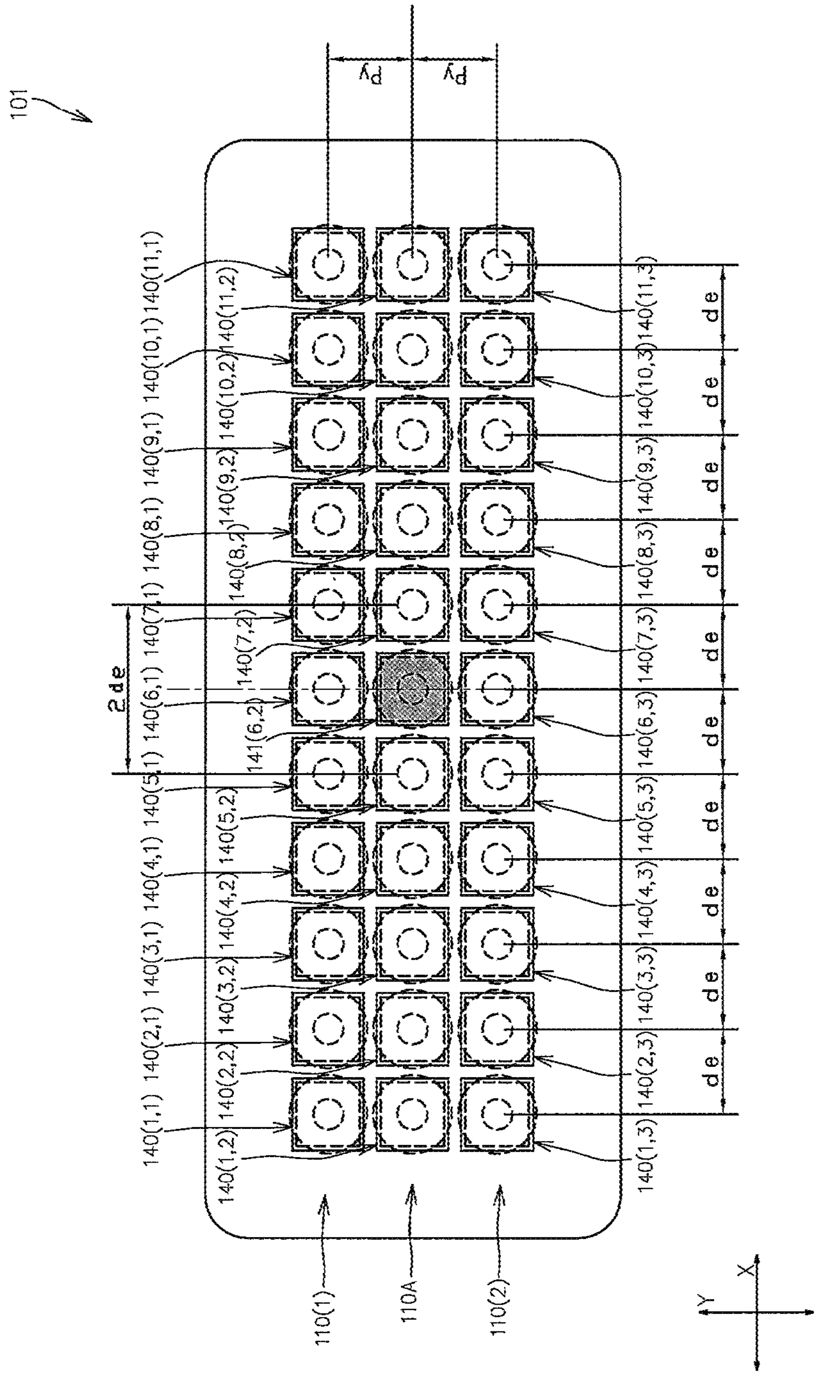
FIG. 2 is a partial plan view of the array taken along the line II-II in FIG. 1.

FIG. 2 illustrates a plan view of the array 101 taken along the line II-II in FIG. 1.

As illustrated in FIGS. 1 and 2, the transducer array 101 includes:

- a support plate 120 having a first surface 121 on one side in the thickness direction and a second surface 122 on the other side in the thickness direction, the rigid support plate 120 being provided with a through-hole group including a plurality of through-holes 125 penetrating between the first and second surfaces 121, 122;
- a flexible resin film 130 fixed to the first surface 121 of the support plate 120 in such a way as to cover the plurality of through-holes 125;
- the same number of piezoelectric elements as the plurality of through-holes 125 that are fixed to the flexible resin film 130 in such a way that middle portions thereof overlap, in a plan view, the corresponding through-holes 125 and peripheral portions thereof overlap, in a plan view, the first surface 121 of the support plate 120.

The plurality of piezoelectric elements and the corresponding portions of the flexible resin film 130 form a plurality of transducers 110.

The plurality of piezoelectric elements include a plurality of transmission piezoelectric elements 140 forming transmission transducers that generate ultrasonic waves in response to application of a driving voltage signal having a predetermined driving frequency (within a range of 30 kHz-50 kHz, and, for example, 40 kHz), and one or a plurality of reception piezoelectric elements 141 forming one or a plurality of reception transducers that generate reception voltage signals in response to reception of ultrasonic waves.

As shown in FIG. 2, in the present embodiment, the plurality of piezoelectric elements 30 include thirty-two transmission piezoelectric elements 140 and one reception piezoelectric element 141.

In order to allow easy understanding, the reception piezoelectric element 140 is painted in FIG. 2.

The transmission piezoelectric element 140 cooperates with the corresponding portion of the flexible resin film 130 to form the transmission transducer that generates the ultrasonic wave in response to application of the driving voltage signal having the predetermined driving frequency to the transmission piezoelectric element 140.

In the present embodiment, the transmission transducer has following configurations so as to be of a non-resonant type that effectively generates ultrasonic wave in response to application, to the transmission piezoelectric element, of the driving voltage signal having the predetermined driving frequency lower than the frequency of the lowest resonant mode of the transmission transducer 110 while being configured to have the frequency of the lowest resonant mode of the transmission transducer 110 higher than the predetermined driving frequency.

The support plate 120 can be formed of various materials having rigidity, and can be formed of metal such as stainless steel, and preferably a ceramic material such as SiC or $Al_2O_3$, which has a lower density and a higher Young's modulus than metal.

The plurality of through-holes 125 include a plurality of transmission through-holes 125*a* covered by the plurality of transmission piezoelectric elements 140 in a plan view, respectively, and one or a plurality of reception through-holes 125*b* (one reception through-hole 125*b* in the present embodiment) covered by one or the plurality of reception piezoelectric elements 141 (one reception piezoelectric element 141) in a plan view.

As shown in FIG. 1, the transmission thorough-hole 125*a* includes a recess 126*a* opened to the first surface 121 of the support plate 120 and a waveguide 127*a* having a first end on one end side that has an opening width smaller than the recess 126*a* and is opened to a bottom surface of the recess 126*a* and a second end on the other end side that is opened to the second surface 122 of the support plate 120.

The waveguide 127*a* includes a tubular portion 128*a* having the first end that is opened to the bottom surface of the recess 126*a* and a horn portion 129*a* having the second end that is opened to the second surface 122 of the support plate 120.

The tubular portion 128*a* has an opening width that is smaller than that of the recess 126*a* and is constant throughout the thickness direction.

The horn portion 129*a* is formed to have an opening width that is increased as being close to a distal end side opened to the second surface 122 of the support plate 120 from a proximal end side connected to the tubular portion 128*a*.

In the present embodiment, the reception through-hole 125*b* has the substantially same configuration as the transmission through-hole 125*a*.

Specifically, the reception thorough-hole 125*b* includes a recess 126*b* opened to the first surface 121 of the support plate 120 and a waveguide 127*b* having a first end on one end side that has an opening width smaller than the recess 126*b* and is opened to a bottom surface of the recess 126*b* and a second end on the other end side that is opened to the second surface 122 of the support plate 120.

The waveguide 127*b* includes a tubular portion 128*b* having the first end that is opened to the bottom surface of the recess 126*b* and a horn portion 129*b* having the second end that is opened to the second surface 122 of the support plate 120.

The tubular portion 128*b* has an opening width that is smaller than that of the recess 126*b* and is constant throughout the thickness direction.

The horn portion 129*b* is formed to have an opening width that is increased as being close to a distal end side opened to the second surface 122 of the support plate 120 from a proximal end side connected to the tubular portion 128*b*.

Alternatively, the reception through-hole 125*b* may be configured to be different from the transmission through-hole 125*a*.

As shown in FIG. 1, in the present embodiment, the support plate 120 includes an upper support plate 120(1) provided with openings forming the plurality of recesses 126 and a lower support plate 120(2) formed with the plurality of waveguides 125, and is configured as laminated structure in which the upper support plate 120(1) and the lower support plate 120(2) are fixed to each other.

Alternatively, of course, the support plate 120 can be configured as a single structure that integrally has a portion formed with the plurality of recesses 126 and a portion formed with the plurality of waveguides 125.

The flexible resin film 130 is formed of insulating resin such as polyimide having a thickness of 20 μm to 100 μm.

The flexible resin film 130 is fixed to the support plate 120 by various methods such as adhesive and thermocompression bonding.

The transmission piezoelectric elements 140 are fixed to the first surface (a surface on an opposite side from the support plate 120) of the flexible resin film 130 such that central regions of the piezoelectric elements 140 overlap with corresponding recesses 126*a* and peripheral regions of the piezoelectric elements 140 overlap with the first surface 121 of the support plate 120 in a plan view.

Rigidity of the transmission piezoelectric element 140 and an overlapping width in a plan view between the transmission piezoelectric element 140 and the first surface 121 of the support plate 120 are set in such a way that the transmission transducer has the frequency of the lowest resonant mode higher than the driving frequency and effectively generates ultrasonic wave in response that the driving voltage signal having the predetermined driving frequency lower than the frequency of the lowest resonant mode of the transmission transducer is applied to the transmission piezoelectric element 140.

For example, in a case where the driving frequency is 30 kHz-50 kHz, the transmission transduce is set so as to have the resonant frequency of, for example, 70 kHz-80 kHz.

The transmission transducer of a non-resonant type can realize following effects.

Specifically, in order to detect an object several meters away by a phased array in which the plurality of transmission piezoelectric elements 140 forming the transmission transducers are arranged in line, it is necessary to precisely control the phases of the sonic waves that are radiated from the plurality of transmission transducers formed by the plurality of transmission piezoelectric elements 140.

For example, in a phased array in which a plurality of transmission piezoelectric elements are directly arranged in parallel on a rigid support plate made of stainless steel or the like, it is necessary to expand and contract the transmission piezoelectric elements against the rigidity of the rigid support plate so that vibrating bodies (transducers) formed by the transmission piezoelectric elements and the rigid support plate make flexural vibration with a predetermined amplitude to ensure the magnitude of generated sound pressure.

In order to achieve the above, the frequency (driving frequency) of the voltage applied to the transmission piezoelectric element needs to be set near the resonant frequency in the flexural vibration mode of the transducers formed by the transmission piezoelectric element.

However, a phase of a frequency response in the flexural vibration mode of the transmission transducer formed by the transmission piezoelectric element with respect to the voltage applied to the transmission piezoelectric element changes largely in the vicinity of the resonance frequency of the transducer.

Therefore, in order to precisely control the phases of the sonic waves generated by the plurality of transmission transducers with the aim of achieving the function of a phased array sensor, it is necessary to suppress as much as possible "dispersion" in the resonance frequency among the plurality of transmission transducers, which is very difficult.

With respect to this point, as described above, the ultrasonic transducer array 101 includes the rigid support plate 120 provided with the plurality of transmission recesses 125*a* penetrating between the first surface 121 and the second surface 122, the flexible resin film 130 fixed to the first surface 121 of the support plate 120 so as to cover the plurality of transmission recesses 125*a*, and the plurality of transmission piezoelectric elements 140 fixed to the first surface 131 of the flexible resin film 130 such that the central regions of the transmission piezoelectric elements 140 overlap the corresponding transmission recesses 125 and the peripheral regions of the transmission piezoelectric elements 140 overlap the first surface 121 of the support plate 120, in a plan view.

According to this configuration, even if the resonant frequency in the flexural vibration mode of the transmission transducers formed by the transmission piezoelectric elements 140 is set to be higher than the driving frequency of the voltage signal applied to the transmission piezoelectric elements 140, the sound pressure of the radiated sonic waves of the transmission transducers can be sufficiently secured.

Moreover, when the resonant frequency of the transmission transducer is higher than the driving frequency applied to the transmission piezoelectric element 140, even if there is "dispersion" or "variation" in the resonant frequency among the plurality of transmission transducers, no significant difference occurs in the phase of the frequency response in the flexural vibration mode of the plurality of transmission transducers.

Therefore, the phase of the sonic waves generated by the plurality of transmission transducers can be precisely controlled.

In detail, in order to detect an object several meters away using the ultrasonic transducer array 101, the frequency of the ultrasonic wave radiated by the transmission transducer formed by the transmission piezoelectric element 140 needs to be a low frequency of about 30 to 50 kHz.

When the resonant frequency of the transmission transducer is set to a resonant frequency (e.g., 70 kHz) that is sufficiently higher than the driving frequency (30 to 50 kHz) applied to the transmission piezoelectric element 140, the sound pressure of the ultrasonic waves generated by the transmission transducer can be increased by increasing the longitudinal and lateral dimensions in a plan view of the transmission piezoelectric element 140.

However, on the other hand, in a case where the plurality of transmission transducers (the plurality of transmission piezoelectric elements 140) are arranged in line at predetermined intervals, as in the transducer array 101, it is necessary to make the arrangement pitch of the plurality of transmission transducers (the plurality of transmission piezoelectric elements 140) equal to or less than half the wavelength λ of the ultrasonic waves radiated by the transmission transducer, in order to suppress the occurrence of grating lobes in the sonic waves radiated from the plurality of transmission transducers.

In air at temperature 20° C., a wavelength A of the ultrasonic wave with a frequency of 40 kHz is 8.6 mm. Therefore, in order to suppress the generation of the grating lobe phenomenon in a state where the transmission transducer is configured to emit the ultrasonic waves having the frequency of 40 kHz, the arrangement pitch de (see FIG. 2) of the plurality of transmission transducers (the plurality of transmission piezoelectric elements 140) needs to be set to 8.6 mm/2=4.3 mm or less.

Therefore, it is preferable that the longitudinal and lateral dimensions of the transmission piezoelectric element 140 in a plan view are 3.0 mm or more from the viewpoint of ensuring sound pressure, and 4.0 mm or less from the viewpoint of suppressing the generation of grating lobes.

In the present embodiment, the transmission piezoelectric elements 140 are each square in a plan view. However, instead of this, the planar shape of the transmission piezoelectric element 140 may be a rectangular shape including a rectangle having maximum longitudinal and lateral dimensions of 4.30 mm or less, a circular shape having a diameter of 4.0 mm or less, or an elliptical shape having a major axis of 4.0 mm or less.

The opening width of the recess 125*a* is set such that the frequency in the lowest resonant mode of the flexural vibration of the transmission transducer formed by the transmission piezoelectric element 140 and the flexible resin film 130 is greater than the frequency (driving frequency) of a voltage signal applied to the transmission piezoelectric element 140.

Preferably, the recess 125*a* is configured to have a similar shape to the transmission piezoelectric element 140 such that an overlapping width in a plan view between the peripheral region of the transmission piezoelectric element 140 and the support plate 120 is 0.05 mm to 0.1 mm over the entire periphery of the transmission piezoelectric element 140.

That is, in a case where the transmission piezoelectric element 140 has a square shape with each side of 4.0 mm in a plan view, the recess 125*a* preferably has a square shape with each side of 3.8 mm to 3.9 mm in a plan view, and in a case where the transmission piezoelectric element 140 has a circular shape with a diameter of 4.0 mm in a plan view, the recess 125*a* preferably has a circular shape with a diameter of 3.8 mm to 3.9 mm in a plan view.

The transmission transducer is configured to have the frequency of the lowest resonant mode equal to or more than 1.5 times of the driving frequency. For example, in a case where the driving frequency is 40 kHz, the transmission transducer is configured to have the frequency of the lowest resonant mode equal to or more than 60 kHz (=1.5×40 kHz).

Moreover, in the ultrasonic transducer array 101, the transmission through-hole 125*a* includes the recess 126*a* opened to the first surface 121 of the support plate 120 and the waveguide 127*a* having the first end on one end side that has the opening width smaller than the recess 126*a* and is opened to the bottom surface of the recess 126*a* and the second end on the other end side that is opened to the second surface 122 of the support plate 120, and the waveguide 127*a* includes the tubular portion 128*a* having the first end that is opened to the bottom surface of the recess 126*a* and the horn portion 129*a* having the second end that is opened to the second surface 122 of the support plate 120.

The configuration further secures the sound pressure of the radiated sonic waves of the transmission transducers.

As shown in FIG. 2, in the present embodiment, the through-hole group including the transmission through-holes 125*a* and the reception through-holes 125*b* has an X-direction row formed by m (m is an integer of 3 or higher, and m=11 in the present embodiment) pieces of the through-holes 125 that are arranged at a predetermined X-direction array pitch de in an X-direction in an X-Y plane of the support plate.

The through-hole group may include a single X-direction row, or, alternatively may include a plurality of X-direction rows that are arranged at a predetermined Y-direction array pitch Py in a Y-direction in the X-Y plane.

In the present embodiment, as shown in FIG. 2, the through-hole group includes a reference X-direction row 110A, and a first adjacent X-direction row 110(1) and a second adjacent X-direction row 110(2) respectively arranged on one and the other sides in the Y-direction of the reference X-direction row 110A at the Y-direction array pitch Py.

One of m pieces (11 pieces in the present embodiment) of the through-holes 125 forming the reference X-direction row 110A is the reception through-hole 125*b*, and the remaining through-holes 125 are the transmission through-holes 125*a*.

The transmission piezoelectric elements 140 and the reception piezoelectric element 141 are arranged in such a way as to cover the corresponding transmission through-holes 125*a* and the reception through-hole 125*b* in a plan view, respectively.

Numbers in parentheses added after the reference numerals 140 and 141 in FIGS. 1 and 2 indicate X and Y coordinate positions (X-direction position and Y-direction position).

Namely, the front side numbers in parentheses indicate X-direction positions (X-direction positions in a case where one side end (the left side end in FIG. 2) in X-direction is a first position) of the piezoelectric elements 140, 141, and the rear side numbers in parentheses indicate Y-direction positions (Y-direction positions in a case where one side end (the upper end in FIG. 2) in Y-direction is a first position) of the piezoelectric elements 140, 141.

Specifically, for example, (1, 1) indicates a position at a first from the one end in X-direction and a first from the one end in Y-direction, and (2, 3) indicates a position at a second from the one end in X-direction and a third from the one end in Y-direction.

As shown in FIG. 2, in the present embodiment, the reception piezoelectric element 141 is arranged at a position indicated by (6, 2) (that is, at a position at a center in X-direction (a 6-th from the one side end in X-direction) and a center in Y-direction (a second from the one side end in Y-direction).

As shown in FIG. 2, the X-direction array pitch between the transmission piezoelectric elements 141 (the transmission piezoelectric element 140(5, 2) and the transmission piezoelectric element 140(7, 2) in the present embodiment) adjacent to each other in X-direction with sandwiching the reception piezoelectric element 141 is 2×de rather than the predetermined X-direction array pitch de.

In such a configuration where the X-direction array pitch of a part of the transmission piezoelectric elements in the array 101 is larger than the predetermined X-direction array pitch de, there is a risk that the sound pressure of the ultrasonic waves radiated from the plurality of transmission transducers do not reach a desired sound pressure level.

With respect to this point, the inventor of the present invention has performed a finite element method analysis (hereinafter referred to as FEM analysis) regarding the sound pressure level (hereinafter referred to as SPL) of the radiated sonic wave with using a model having the same arrangement as the ultrasonic transducer array shown in FIG. 2. That is, the model (hereinafter referred to as first example model) is configured so that the reception piezoelectric element 141 is arranged at a center in X-direction of the reference X-direction row 110A that is disposed at a center in Y-direction, and the remaining 32 pieces of piezoelectric elements are the transmission piezoelectric elements 140.

Figure 3:
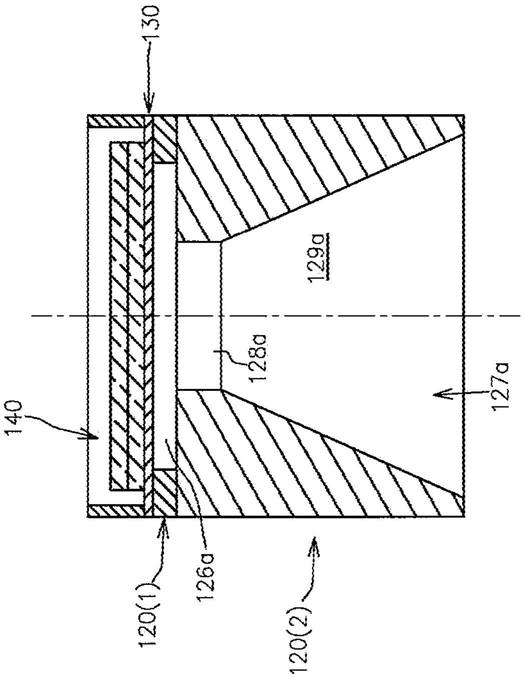
FIG. 3 is a schematic cross-sectional view of only a transmission transducer used in a first example model of the first embodiment.

FIG. 3 illustrates a schematic cross-sectional view of only a transmission transducer used in the first example model.

A shape and a size of the first example model are as follows.

Transmission Piezoelectric Element 140 lead zirconate titanate (PZT)

density $7.97\times10^{2}$ kg/m$^{3}$ two-layer laminated type, thickness of one layer 0.13 mm (total thickness of 0.26 mm)

square shape in a plan view having one side length of 3.4 mm

Flexible Resin Film 130 polyimide film having a thickness of 0.05 mm

Upper Support Plate 120(1)

SUS 304 having a thickness of 0.1 mm

Recess 126*a* (opening formed in upper support plate 120(1))

square shape in a plan view having one side length of 3.3 mm

Lower Support Plate 120(2)

alumina ($Al_2O_3$) having a thickness of 3.25 mm

Waveguide 127*a* Formed in Lower Support Plate 120(2)

Waveguide 127*a* include tubular portion 128*a* having a diameter of 1.5 mm and a length of 0.5 mm and horn portion 129*a* having an opening diameter of 3.7 mm on a distal end and a length of 2.75 mm In a first example—(1), sine waveform driving voltages of amplitude of 10 V were applied to all (32 pieces) of the transmission piezoelectric elements 140 with changing the driving frequencies of the driving voltages within a frequency range (25-60 kHz) lower than the resonance frequency (appropriate 80 kHz) of the transmission transducer formed by the transmission piezoelectric elements 140, and the SPLs for each of the driving frequencies were calculated by the FEM analysis.

Figure 4:
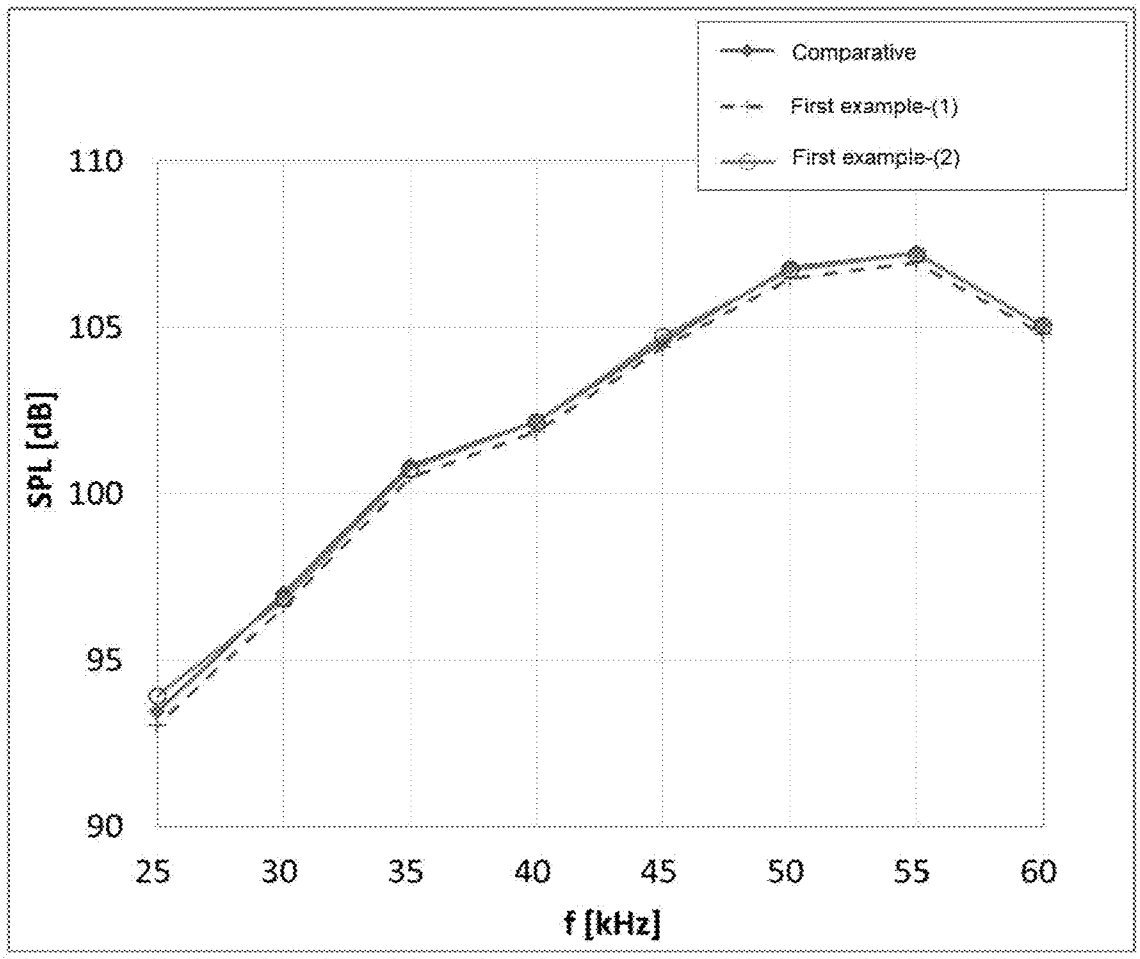
FIG. 4 is a graph showing a result of calculation wherein a relationship between frequencies of driving voltage and sound pressure levels of sonic waves radiated by the first example model were calculated by finite element method analysis with changing the driving frequencies of the driving voltages within a range of 25 to 60 kHz, for a case (a first example—(1)) where sine waveform driving voltages of amplitude of 10 V were applied to all of the 32 pieces of the transmission piezoelectric elements in the first example model, a case (a first example—(2)) where sine waveform reinforced driving voltages of an amplitude of 15 V were applied to two transmission piezoelectric elements, out of the transmission piezoelectric elements in the first example model, that were adjacent to a reception piezoelectric element in a direction orthogonal to a scanning direction and sine waveform driving voltages of amplitude of 10 V were applied to the remaining 30 pieces of the transmission piezoelectric elements, and a case (comparative example) where sine waveform driving voltages of amplitude of 10 V were applied to all of 33 pieces of the transmission piezoelectric elements in a configuration where the reception piezoelectric element was replaced with the transmission piezoelectric element in the first example model.

The analysis result of the first example—(1) is shown in FIG. 4.

In a first example—(2), sine waveform reinforced driving voltages of a reinforced amplitude of 15 V were applied to first and second adjacent transmission piezoelectric elements (the transmission piezoelectric element 140(6, 1) and the transmission piezoelectric element 140(6, 3) in FIG. 2) adjacent to the reception piezoelectric element 141 on one side and the other side in Y-direction, respectively, and sine waveform driving voltages of amplitude of 10 V were applied to the remaining 30 pieces of the transmission piezoelectric elements 140. In the first example—(2), the driving frequencies of the driving voltages were changed in the same manner as the first example—(1), and the SPLs for each of the driving frequencies were calculated by the FEM analysis.

The analysis result of the first example—(2) is also shown in FIG. 4.

The first example—(2) is intended so that a radiated sonic wave of a transmission piezoelectric element that cannot be arranged at the position (6, 2) due to the reception piezoelectric element 141 is compensated by the first and second adjacent transmission elements (the transmission piezoelectric element 140(6, 1) and the transmission piezoelectric element 140(6, 3) in FIG. 2) to which the reinforced driving voltages are applied.

Furthermore, in a comparative example, sine waveform driving voltages of amplitude of 10 V were applied to all (33 pieces) of the transmission piezoelectric elements 140 in a configuration where the reception piezoelectric element 141 was replaced with the transmission piezoelectric element 140 in the first example model, that is, the configuration where all of the 11×3 pieces of piezoelectric elements are transmission piezoelectric elements. In the comparative example, the driving frequencies of the driving voltages were changed in a similar range (10-70 kHz), and the SPLs for each of the driving frequencies was calculated by the FEM analysis.

The result is also shown in FIG. 4.

As shown in FIG. 4, although the first example—(1) has a sound level a little bit lower than the comparative example, it is confirmed that the first example—(2) has the substantially same sound level as the comparative example all over the region of the range where the driving frequencies were changed.

Furthermore, in each of the first example—(1), the first example—(2) and the comparative example in a case where the driving frequency of the driving voltage was 40 kHz, a directivity in a lateral direction of the sound pressure of the radiated sonic wave was calculated by the FEM analysis.

Figure 5:
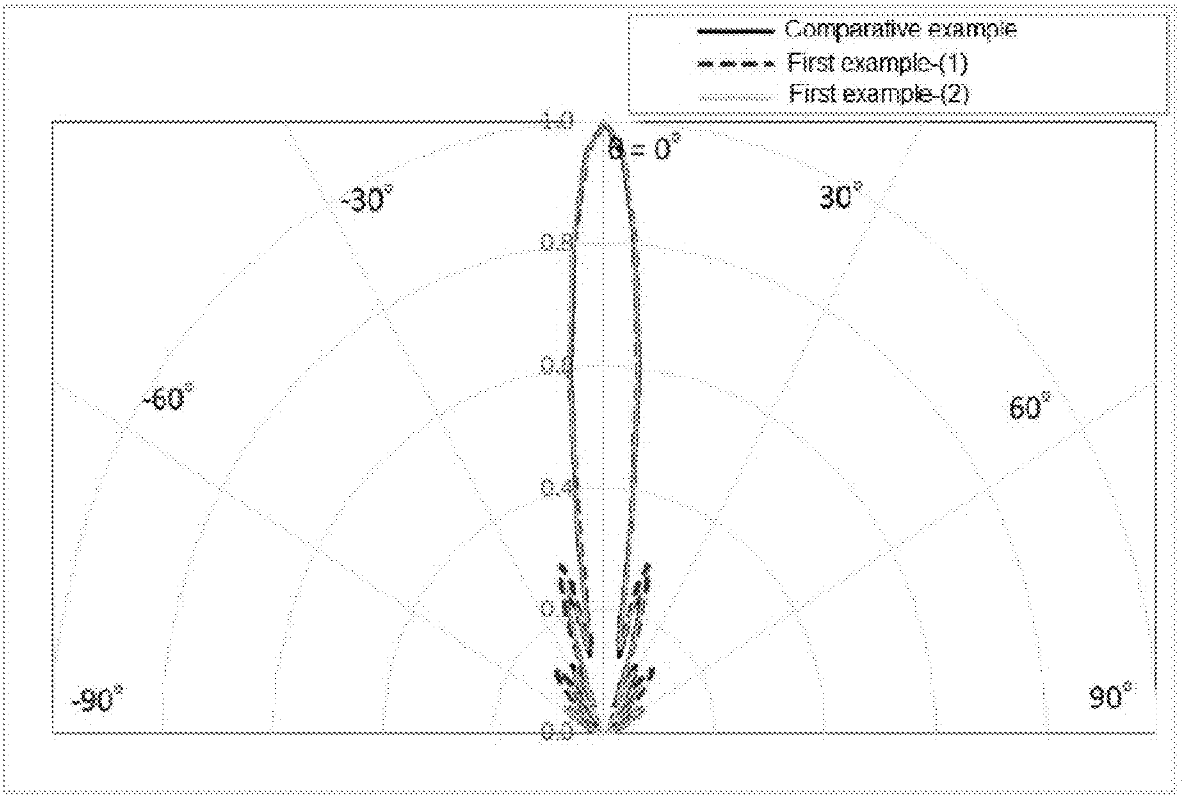
FIG. 5 is a graph showing a result of calculation wherein directivity in a lateral direction of the sound pressures of the radiated sonic waves in the first example—(1), the first example—(2) and the comparative example in a case where the driving frequency of the driving voltage is 40 kHz is calculated by finite element method analysis.

The result is shown in FIG. 5.

As shown in FIG. 5, it is confirmed that both of the first example—(1) and the first example—(2) are comparable to the comparative example also in regards to the directivity of the sound pressure.

In the first example, by making the amplitude of the driving voltage signal applied to the first and second adjacent transmission piezoelectric elements larger than the amplitude of the driving voltage signal applied to the remaining transmission piezoelectric elements while causing all of the transmission piezoelectric elements to have the same configuration, it is achieved that the amplitudes of the first and second adjacent transmission piezoelectric elements become larger than those of the remaining transmission piezoelectric elements, thereby preventing or reducing the sound level of the radiated sonic wave from being deteriorated due to provision of the receipt piezoelectric element 141. Alternatively, it is also possible to prevent or reduce the sound level of the radiated sonic wave from being deteriorated by having a following configuration. In this alternative configuration, it is needed to set thicknesses of the piezoelectric elements so that the resonance frequency is kept within a range higher than the driving frequency.

Specifically, by utilizing, as the first and second adjacent transmission piezoelectric elements, a piezoelectric element having a thickness thinner than the remaining transmission piezoelectric elements, it is possible to make vibration displacements of the first and second adjacent transmission piezoelectric elements larger than those of the remaining transmission piezoelectric elements in a case where driving voltage signals having the same amplitude are applied to all of the transmission piezoelectric elements. Therefore, the deterioration of the sound level of the radiated sonic waves can be prevented or reduced.

In a preferable configuration, as shown in FIG. 1, the reception element 141 is symmetrically arranged with respect to the center in X-direction of the X-direction row so as to effectively receive.

The transducer array 101 according to the present embodiment has the single reception piezoelectric element 141(6, 2). In this case, the reception piezoelectric element 141(6, 2) is arranged at the center in X-direction of the X-direction row.

Next, the reception transducer formed by the reception piezoelectric element 141 and the corresponding portion of the flexible film 130 will be explained.

In the present embodiment, the reception transducer is of a resonant type that performs resonant vibration in response to receipt of the ultrasonic wave having the frequency corresponding to the driving frequency.

Specifically, the reception transducer is configured in such a way as to have the frequency of the lowest resonant mode that is same as or close to the predetermined driving frequency.

Specifically, the reception transducer is configured so as to have the frequency of the lowest resonant mode within a range from 0.8 times to 1.2 times the driving frequency. That is, in a case where the driving frequency is, for example, 40 kHz, the reception transducer is configured so as to have the frequency of the lowest resonant mode from 32 kHz (=0.8× 40 kHz) to 48 kHz (=1.2× 40 kHz).

Here, an analysis that the inventor of the present invention performed regarding a shape of the reception through-hole 125*b* is explained.

Figures 6A, 6B, 6C:
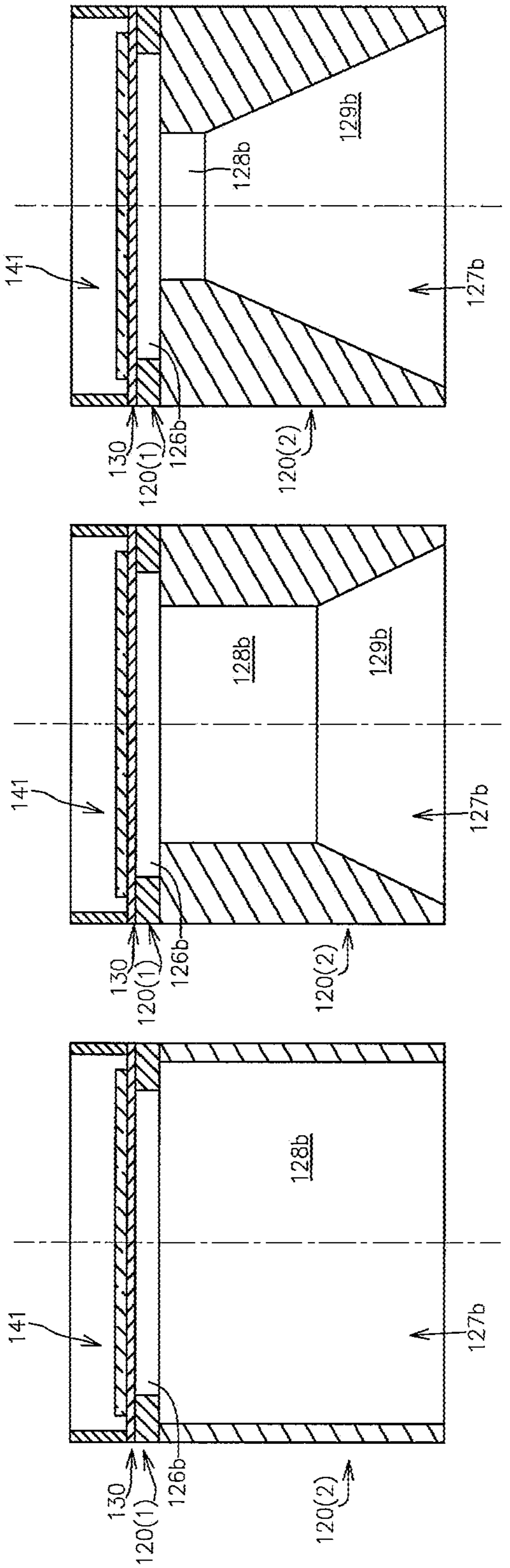
FIGS. 6A to 6C are schematic cross-sectional views of reception transducer models A to C on which an analysis regarding reception sensitivity was performed.

FIGS. 6A to 6C illustrate schematic cross-sectional views of reception transducer models used in this analysis.

Configurations of the models A to C are as follows.

The Model A

Reception Piezoelectric Element 141 lead zirconate titanate (PZT)

$$\text{density } 7.97\times 10^{2}\ \text{kg/m}^{3}$$

thickness of 0.08 mm and square shape in a plan view having one side length of 3.4 mm Flexible Resin Film 130 polyimide film having a thickness of 0.05 mm

Upper Support Plate 120(1)

SUS 304 having a thickness of 0.1 mm

Recess 126*a* (opening formed in upper support plate 120(1)) square shape in a plan view having one side length of 3.3 mm Lower Support Plate 120(2)

alumina ($Al_2O_3$) having a thickness of 3.25 mm

Waveguide 127*b* Formed in Lower Support Plate 120(2)

Waveguide 127*b* include tubular portion 128*b* having a diameter of 3.7 mm over an entire region in a thickness direction The models B and C are changed from the model A only in respect to the waveguide 127*b*.

Specifically, the waveguide 127*b* of the model B includes a tubular portion 128*b* having a diameter of 2.5 mm and a length of 1.75 mm, and a horn portion 129*b* having a length of 1.5 mm with an opening width at a distal end side of 3.7 mm.

The waveguide 127*b* of the model C includes a tubular portion 128*b* having a diameter of 1.5 mm and a length of 0.5 mm, and a horn portion having a length of 2.75 mm with an opening width at a distal end side of 3.7 mm.

The model C is identical to the first example model except that the transmission piezoelectric element 141 is replaced by the reception piezoelectric element 140.

For each of the models A to C, a voltage V of a reception voltage signal that is generated by the reception piezoelectric element 141 in response to a vibration of the reception transducer generated by a sonic wave of sound pressure P that is entered into the opening at the distal end side and is then transmitted within the waveguide 127 and the recess 126*b* was obtained by using the finite element method analysis, and V/P was calculated as reception sensitivity.

With changing the frequency of the sonic wave within in a range from 25 kHz to 65 kHz, V/P for each of the sonic waves of the changed frequencies was calculated.

Figure 7:
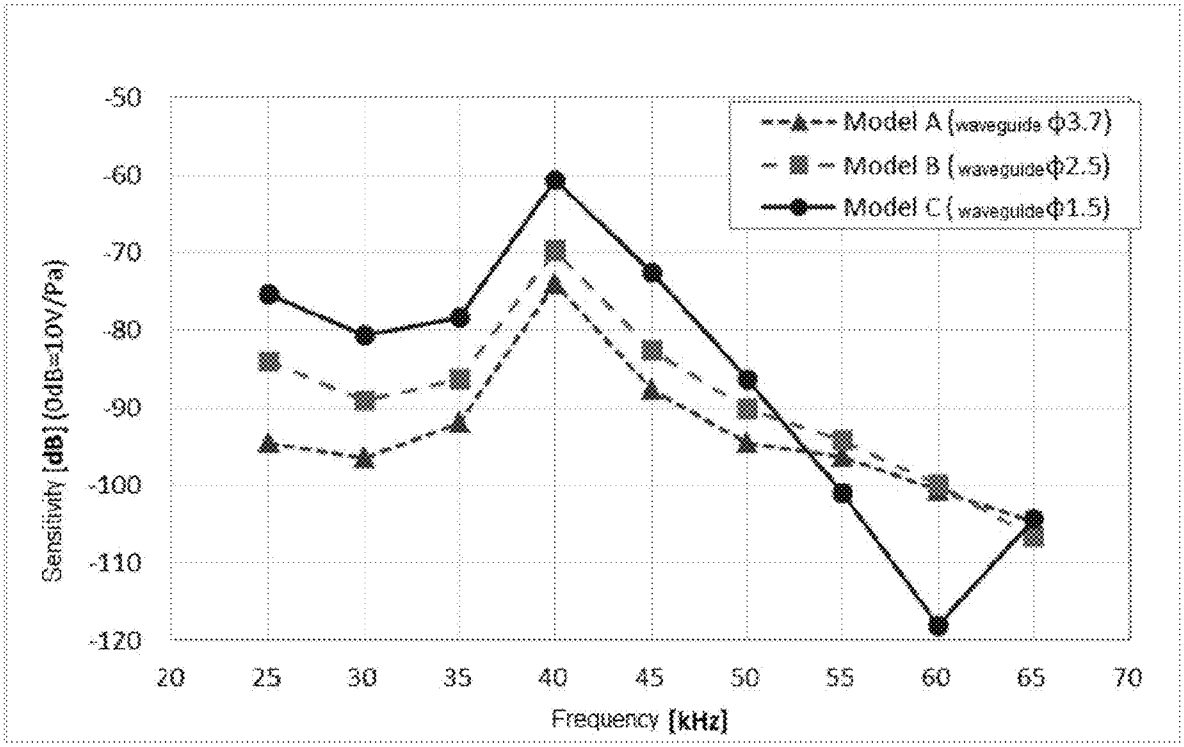
FIG. 7 is a graph showing a result of calculation wherein a relationship between frequency of sonic wave and reception sensitivity (V/P) was calculated by finite element method analysis with changing the frequency of sonic wave of sound pressure P, which was entered into a distal opening of a waveguide, within in a range from 25 kHz to 65 kHz, for cases where the models A to C were vibrated by the sonic wave of sound pressure P.

The result is shown in FIG. 7.

The sensitivity on the vertical axis of FIG. 7 is shown in decibel representation wherein 0 dB=10 V/P.

As shown in FIG. 7, it is confirmed that the model C has the best sensitivity within an assumed range (30 kHz-50 kHz) of the driving frequency of the driving voltage.

Based on the analysis, in the present embodiment, the reception through-hole 125*b* has the same shape as the transmission through-hole 125*a* as shown in FIG. 1.

Next, detailed configurations of the piezoelectric elements 140, 141 will be explained.

Figure 8B:
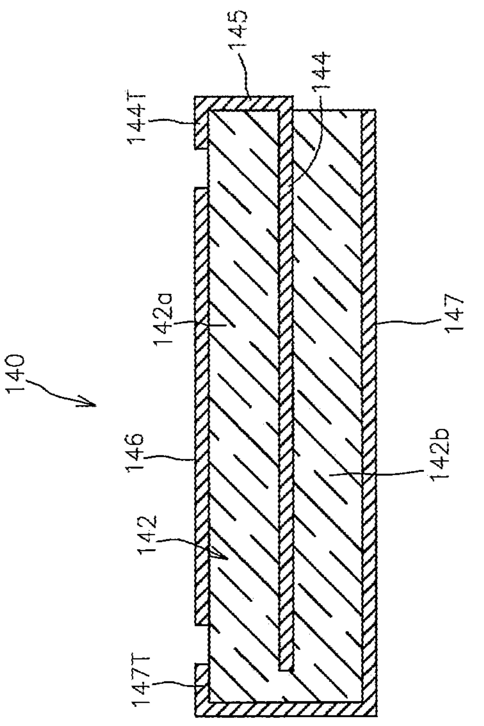
FIG. 8B is a cross-sectional view taken along the line VIII-VIII in FIG. 8A.
Figure 8A:
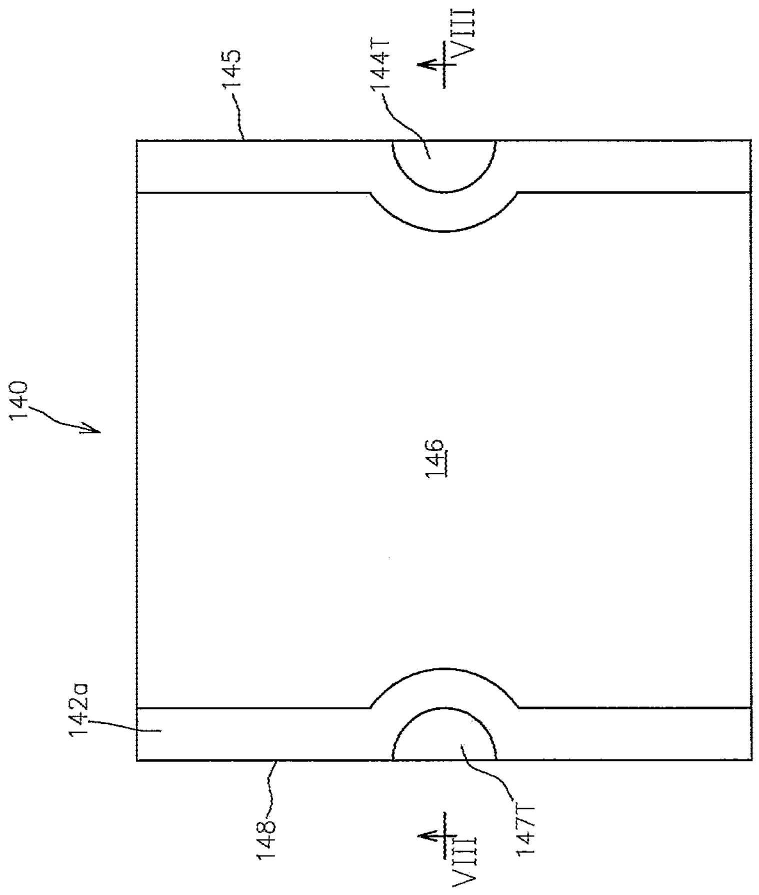
FIG. 8A is a plan view of the transmission piezoelectric element provided in the transducer array according to the first embodiment.

FIG. 8A illustrates a plan view of the transmission piezoelectric element 140.

FIG. 8B illustrates a cross-sectional view taken along the line VIII-VIII in FIG. 8A.

As shown in FIGS. 1 and 8A, in the present embodiment, the transmission piezoelectric element 140 is of a multilayer laminated type.

Compared to the single-layer piezoelectric element, multilayer laminated piezoelectric element can increase the electric field strength when the same voltage is applied, and can increase the expansion and contraction displacement per applied voltage.

In detail, the multilayer laminated piezoelectric element used as the transmission piezoelectric element 140 includes the piezoelectric element body 142 formed of a piezoelectric material such as lead zirconate titanate (PZT), an inner electrode 144 that divides the piezoelectric element body 142 into a first piezoelectric portion 142*a* on the upper side and a second piezoelectric portion 142*b* on the lower side in the thickness direction, an upper surface electrode 146 fixed to a part of the upper surface of the first piezoelectric portion 142*a*, a lower surface electrode 147 fixed to the lower surface of the second piezoelectric portion 142*b*, an inner electrode connection member 145 having one end that is electrically connected to the inner electrode 144 and the other end that forms an inner electrode terminal 144T accessible on the upper surface of the first piezoelectric portion 142*a* in a state of being insulated from the upper surface electrode 146, and a lower surface electrode connection member 148 having one end that is electrically connected to the lower surface electrode 147 and the other end that forms a lower surface electrode terminal 147T accessible on the upper surface of the first piezoelectric portion 32*a* in a state of being insulated from the upper surface electrode 146 and the inner electrode 34.

In this case, an outer electrode formed by the upper surface electrode 146 and the lower surface electrode 147 acts as one of the first and second electrodes, and the inner electrode 144 acts as the other of the first and second electrodes.

In the multilayer laminated piezoelectric element 140, the first and second piezoelectric portions 142*a* and 142*b* have the same polarization direction in the thickness direction. Consequently, a predetermined voltage is applied between the outer electrode and the inner electrode 144 at a predetermined frequency, so that electric fields in opposite directions to each other are applied to the first and second piezoelectric portions 142*a* and 142*b*.

As described above, the upper surface electrode 146 and the lower surface electrode 147 are insulated from each other. Therefore, when the piezoelectric element 140 is made, the polarization directions of the first and second piezoelectric portions 142*a* and 142*b* can be made the same by applying a voltage between the upper surface electrode 146 and the lower surface electrode 147.

On the other hand, as shown in FIG. 1, the reception piezoelectric element 141 is of a single-layer type that is thinner than the transmission piezoelectric element 140.

The configuration makes it possible to make the rigidity of the reception piezoelectric element 141 weaker than the transmission piezoelectric element 140, thereby effectively making the resonance frequency of the transmission transducer formed by the transmission piezoelectric element 140 higher than the driving frequency while making the resonance frequency of the reception transducer formed by the reception piezoelectric element 141 same as or close to the driving frequency.

As shown in FIG. 1, the transducer array 101 according to the present embodiment further includes a lower sealing plate 150 and a wiring assembly 180.

The lower sealing plate 150 has piezoelectric-element-directed openings each having size sufficient to surround a corresponding one of the plurality of piezoelectric elements, and is fixed to the first surface of the flexible resin film 130 by an adhesive, thermocompression bonding, or the like such that the plurality of piezoelectric elements are located within the respective piezoelectric-element-directed openings in a plan view.

As illustrated in FIG. 1, the thickness of the lower sealing plate 150 is greater than the thickness of the transmission piezoelectric elements 140, and in a state in which the lower sealing plate 150 is fixed to the first surface of the flexible resin film 130, the first surface of the lower sealing plate 150 is spaced farther from the flexible resin film 130 than the upper surface electrode 146, the lower surface electrode terminal 147T, and the inner electrode terminal 144T (see FIG. 8) of each transmission piezoelectric element 140.

The lower sealing plate 150 is made of a rigid material such as metal such as stainless steel, carbon fiber reinforced plastics, and ceramics.

The lower sealing plate 150 seals the sides of a piezoelectric element group including the plurality of piezoelectric elements 140, and also serves as a mounting base to which the wiring assembly 180 is fixed.

The wiring assembly 180 forms a signal transmission path for transmitting a driving voltage signal supplied from a transmission-side unit, which is described below, to the plurality of transmission piezoelectric elements 140, and for transmitting a reception voltage signal generated by the reception piezoelectric element 141 to a reception-side unit 300, which is described below.

As illustrated in FIG. 1, the wiring assembly 180 has an insulating base layer 182 that is fixed to the lower sealing plate 150 by an adhesive or the like, a conductive layer 185 that is fixed to the base layer 182, and an insulating cover layer 187 that surrounds the conductive layer 185.

The base layer 182 and the cover layer 187 are each formed of insulating resin such as polyimide.

The conductive layer 185 is formed of a conductive metal such as Cu.

Preferably, exposed portions of Cu that forms the conductive layer 185 are plated with Ni/Au.

The conductive layer 185 includes a plurality of transmission wirings that are connected to the plurality of transmission piezoelectric elements 140, respectively, and one or a plurality of reception wirings that are connected to one or the plurality of reception piezoelectric elements 141 (the single reception piezoelectric element 141 in the present embodiment).

The transmission wiring includes a transmission first electrode wiring 185*a* and a transmission second electrode wiring 185*b* that are respectively connected to the first electrode (the outer electrode 146, 147 in the present embodiment) and the second electrode (the inner electrode 144 in the present embodiment) of the corresponding transmission piezoelectric element 140.

Similarly, the reception wiring includes a reception first electrode wiring 186*a* and a reception second electrode wiring 186*b* that are respectively connected to a first electrode (for example, the lower electrode) and a second electrode (for example, the upper electrode) of the corresponding reception piezoelectric element 141.

The base layer 182 is formed with a transmission first electrode connection opening and a transmission second electrode connection opening exposing, respectively, connection regions of the transmission first electrode wiring 185*a* and the transmission second electrode wiring 185*b* that are connected to the corresponding electrodes of the transmission piezoelectric element 140, and a reception first electrode connection opening and a reception second electrode connection opening exposing, respectively, connection regions of the reception first electrode wiring 186*a* and the reception second electrode wiring 186*b* that are connected to the corresponding electrodes of the reception piezoelectric element 141.

The connection regions of the transmission first electrode wiring 185*a* and the transmission second electrode wiring 185*b* that are exposed through the transmission first electrode connection opening and the transmission second electrode connection opening are directly and electrically connected to the corresponding electrodes of the transmission piezoelectric element by conductive adhesive or solder, for example.

On the other hand, since the reception piezoelectric element 141 is thinner than the transmission piezoelectric element 140, a separation distance from the reception first electrode wiring 186*a* and the reception second electrode wiring 186*b* to the reception piezoelectric element 141 becomes a relatively large.

In view of this point, as shown in FIG. 2, in the present embodiment, the connection regions of the reception first electrode wiring 186*a* and the reception second electrode wiring 186*b* that are respectively exposed through the reception first electrode connection opening and the reception second electrode connection opening are provided with bumps 189 formed of a conductive metal such as Cu.

The reception first electrode wiring 186*a* and the reception second electrode wiring 186*b* are electrically connected through the bumps 189 to the corresponding electrodes of the reception piezoelectric element 141 by conductive adhesive or solder, for example.

According to the configuration, it is possible to electrically connect the thin reception piezoelectric element 141 to the corresponding reception wirings 186*a*, 186*b* with conductive adhesive or solder of the almost same level of quantity (height) as that of conductive adhesive or solder that is needed to electrically connect the thick transmission piezoelectric element 140 to the corresponding transmission wirings 185*a*, 185*b*, thereby realizing stable electrical connection.

An outer surface of the bump 189 may be provided with Ni/Au layer for preventing oxidation and/or corrosion or the like.

The Ni/Au layer is formed with a thickness of a few micrometers or less, and is preferably formed at the connection regions of the reception wirings 186*a*, 186*b* at the time when the wiring assembly 180 is manufactured.

As shown in FIG. 1, the ultrasonic transducer 101 further includes an upper sealing plate 160 fixed to the top surfaces of the lower sealing plate 150 and the wiring assembly 180 via a flexible resin 155.

The upper sealing plate 160 includes opening parts 162 at positions corresponding to the plurality of piezoelectric elements.

With the upper sealing plate 160, it is possible to obtain a stable support state of the wiring assembly 180 while preventing an influence on a flexural vibration operation of the transducers as much as possible.

For example, the upper sealing plate 160 is formed of a metal such as stainless steel having a thickness of 0.1 mm to 0.3 mm, carbon fiber reinforced plastic, ceramics, and the like.

The ultrasonic transducer 101 further includes a sound absorbing member 165 fixed to the top surface of the upper sealing plate 160 by adhesion or the like to cover the plurality of opening parts 162 of the upper sealing plate 160.

The sound absorbing member 165 is formed of a silicone resin having a thickness of about 0.3 mm to 1.5 mm or another foamed resin, for example.

With the sound absorbing member 165, it is possible to effectively prevent ultrasonic waves generated by the transducers from being emitted to a side opposite to the side to which the sound waves are to be emitted (lower side in FIG. 1).

The ultrasonic transducer 101 further includes a reinforcing plate 170 fixed to the top surface of the sound absorbing member 165 by adhesion or the like.

For example, the reinforcing plate 170 is formed of a metal such as stainless steel having a thickness of about 0.2 mm to 0.5 mm, carbon fiber reinforced plastic, ceramics, and the like.

With the reinforcing plate 170, it is possible to prevent an external force from affecting the support plate 120 and the piezoelectric elements 140 as much as possible.

Second Embodiment

Hereinafter, another embodiment of the ultrasonic transducer array according to the present invention will be described with reference to the accompanying drawings.

Figure 9:
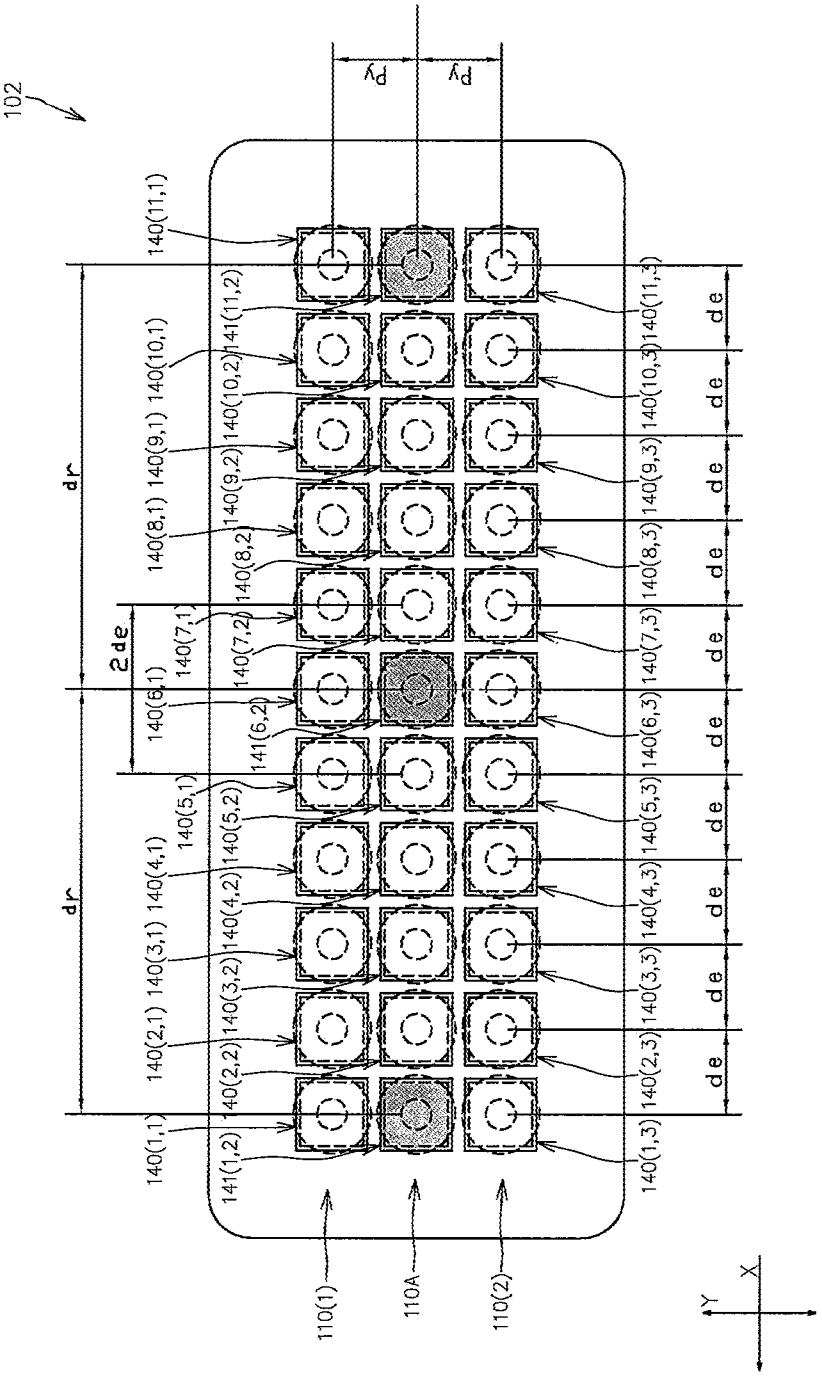
FIG. 9 is a partial plan view of a transducer array according to a second embodiment of the present invention, which corresponds to FIG. 1 in the first embodiment.

FIG. 9 illustrates a partial plan view of a transducer array 102 according to the present embodiment, which corresponds to FIG. 1 in the first embodiment.

In the drawing, the same reference numerals are applied to the same components as those in the first embodiment, and the detailed description thereof will be omitted as appropriate.

The transducer array 102 according to the present embodiment is different from the transducer array 101 including the single reception piezoelectric element 141 in that a plurality of the reception piezoelectric elements 141 are provided.

As shown in FIG. 9, the transducer array 102 includes three pieces of the reception piezoelectric elements 141(1, 2), 141(6, 2), 141(11, 2).

Specifically, a first reception piezoelectric element 141(1, 2) is arranged at an outermost end (at a leftmost in FIG. 9) on one side in X-direction of the reference X-direction row 110A, a second reception piezoelectric element 141(6, 2) is arranged at a center in X-direction of the reference X-direction row 110A, and a third reception piezoelectric element 141(6, 2) is arranged at an outermost end (at a rightmost in FIG. 9) on the other side in X-direction of the reference X-direction row 110A, so that the plurality (three) of the first to third reception piezoelectric elements 141(1, 2), 141(6, 2), 141(11, 2) are arranged so as to be symmetrical with respect to the center in X-direction of the X-direction row.

As described above, the transducer array 102 according to the present embodiment is configured so that the three piezoelectric elements out of all (thirty-three) of the piezoelectric elements are the reception piezoelectric elements 141 and the remaining thirty piezoelectric elements are the transmission piezoelectric elements 140.

Now, an FEM analysis regarding the SPL performed on a model having the same configuration as the ultrasonic transducer array 102 according to the present embodiment shown in FIG. 9, that is, a model (hereinafter referred to as second example model) configured so that the piezoelectric elements arranged at the outermost end on one side, the center and the outermost end on the other side, respectively, in X-direction of the reference X-direction row 110A are the reception piezoelectric elements 141, and the remaining thirty piezoelectric elements are the transmission piezoelectric elements 140 will be explained.

A transmission transducer and a reception transducer of the second example model is set to have the same configuration as the transmission transducer (see FIG. 3) and the reception transducer model C (see FIG. 6C) of the first example model, respectively.

In a second example—(1), sine waveform driving voltages of amplitude of 10 V were applied to all (30 pieces) of the transmission piezoelectric elements 140 in the second example model with changing the driving frequencies of the driving voltages within a frequency range (10-70 kHz) substantially lower than the resonance frequency (appropriate 80 kHz) of the transmission transducer formed by the transmission piezoelectric elements 141, and the SPLs for each of the driving frequencies were calculated by the FEM analysis.

Figure 10:
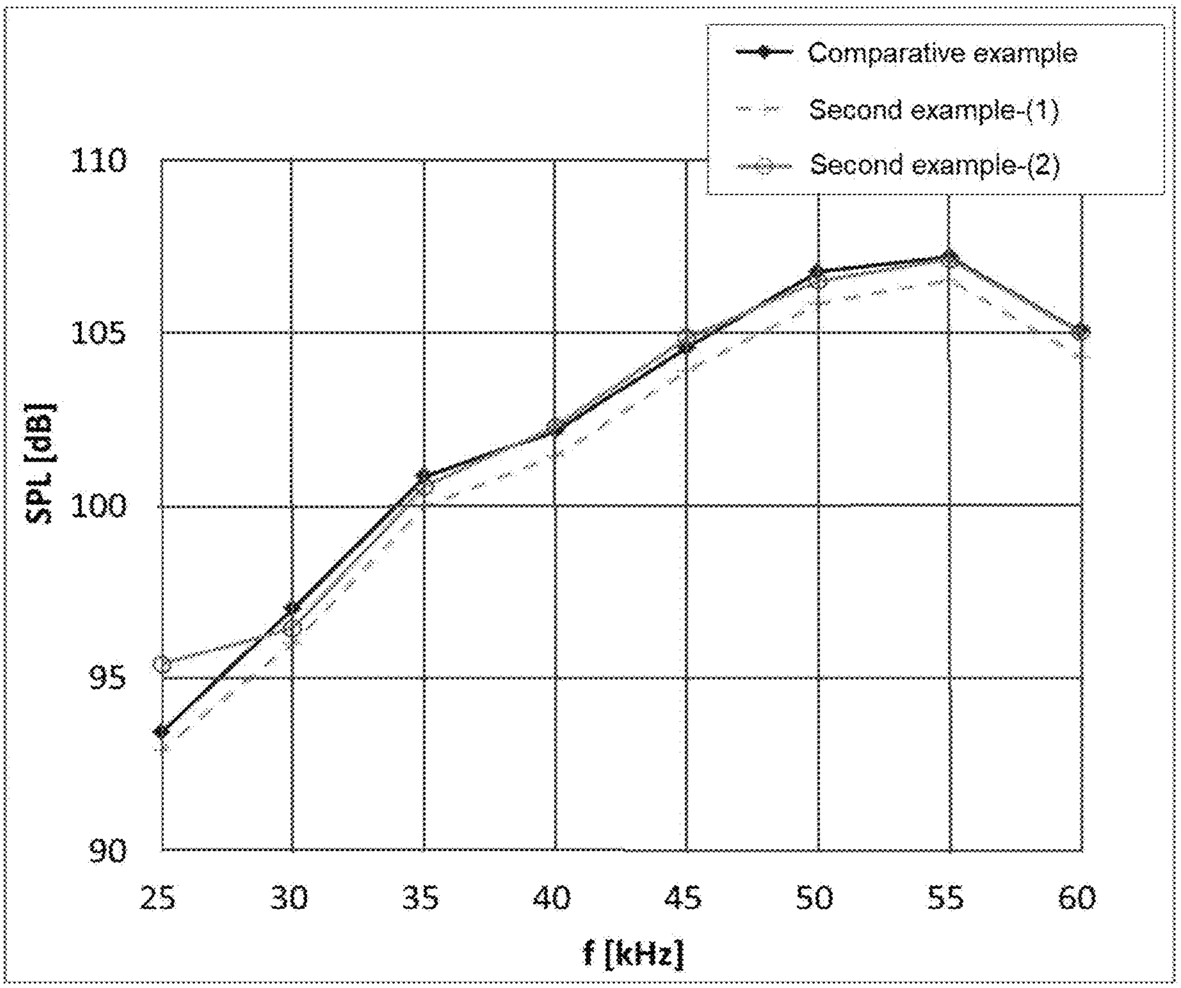
FIG. 10 is. is a graph showing a result of calculation wherein a relationship between frequencies of driving voltage and sound pressure levels of sonic waves radiated by the second example model were calculated by finite element method analysis with changing the driving frequencies of the driving voltages within a range of 25 to 60 kHz, for a case (a second example—(1)) where sine waveform driving voltages of amplitude of 10 V were applied to all of the 30 pieces of the transmission piezoelectric elements in the second example model, a case (a second example—(2)) where sine waveform reinforced driving voltages of an amplitude of 15 V were applied to 6 pieces of transmission piezoelectric elements, out of the transmission piezoelectric elements in the second example model, that were adjacent to the 3 pieces of reception piezoelectric elements in a direction orthogonal to a scanning direction and sine waveform driving voltages of amplitude of 10 V were applied to the remaining 24 pieces of the transmission piezoelectric elements, and a case (comparative example) where sine waveform driving voltages of amplitude of 10 V were applied to all of 30 pieces of the transmission piezoelectric elements in a configuration where the 3 pieces of reception piezoelectric elements were replaced with the transmission piezoelectric elements in the second example model.

The analysis result of the second example—(1) is shown in FIG. 10.

In a second example—(2), sine waveform reinforced driving voltages of a reinforced amplitude of 15 V were applied to six transmission piezoelectric elements 140(1, 1), 140(1, 3), 140(6, 1), 140(6, 3), 140(11, 1), 140(11, 3) that are adjacent to the first to third reception piezoelectric elements on one side and the other side in Y-direction, respectively, and sine waveform driving voltages of amplitude of 10 V were applied to the remaining 24 pieces of the transmission piezoelectric elements 140. In the second example—(2), the driving frequencies of the driving voltages were changed in the same manner as the second example—(1), and the SPLs for each of the driving frequencies were calculated by the FEM analysis.

The analysis result of the second example—(2) is also shown in FIG. 10.

FIG. 10 also shows the result of the comparative example.

As shown in FIG. 10, although the second example—(1) has a sound level a little bit lower than the comparative example, its lowering degree is only about 1%. So, it is confirmed that the second example—(1) can output a sufficient sound pressure.

It is also confirmed that the second example—(2) has the substantially same sound level as the comparative example all over the region of the range where the driving frequencies were changed.

Furthermore, in a case where the driving frequency of the driving voltage was 40 kHz, a directivity in a lateral direction of the sound pressure of the radiated sonic wave in each of the second example—(1), the second example—(2) and the comparative example was calculated by the FEM analysis.

Figure 11:
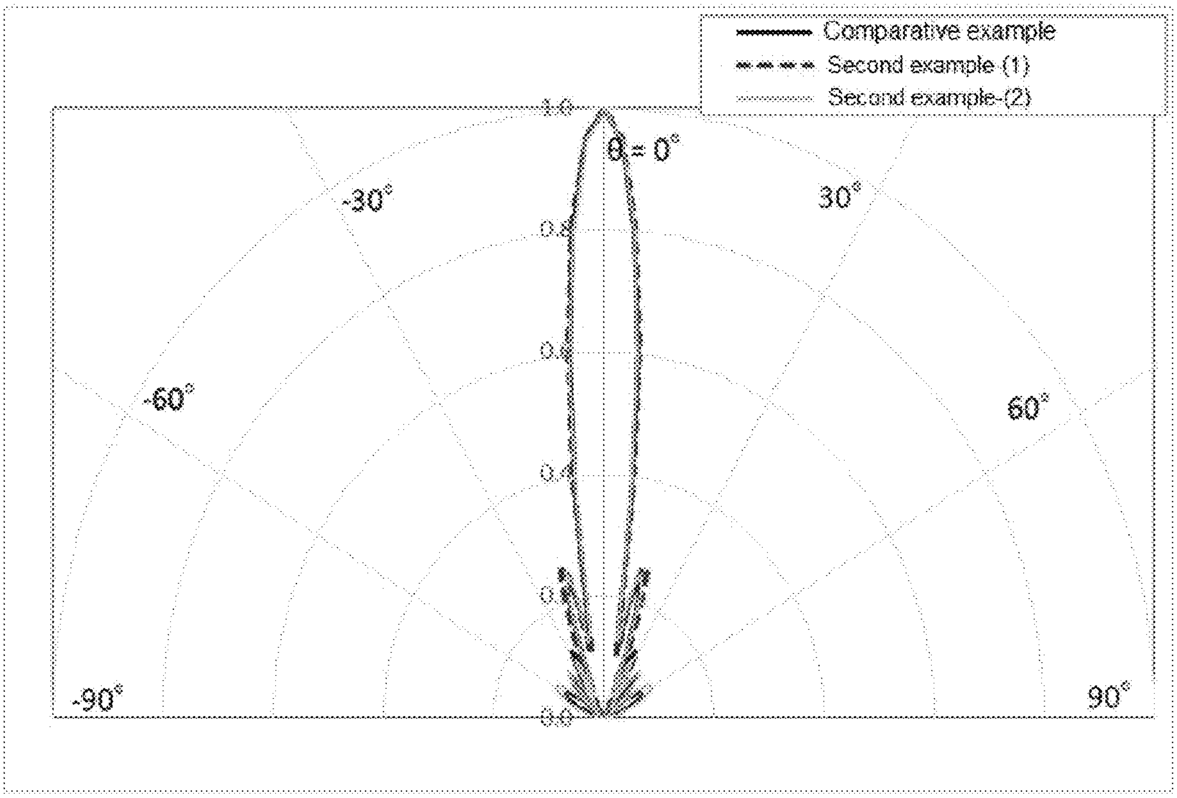
FIG. 11 is a graph showing a result of calculation wherein directivity in a lateral direction of the sound pressures of the radiated sonic waves in the second example—(1), the second example—(2) and the comparative example in a case where the driving frequency of the driving voltage is 40 kHz is calculated by finite element method analysis.

The result is shown in FIG. 11.

As shown in FIG. 11, it is confirmed that both of the second example—(1) and the second example—(2) are comparable to the comparative example also in regards to the directivity of the sound pressure.

Third Embodiment

Hereinafter, one embodiment of a phased array sensor according to the present invention will be described with reference to the accompanying drawings.

Figure 12:
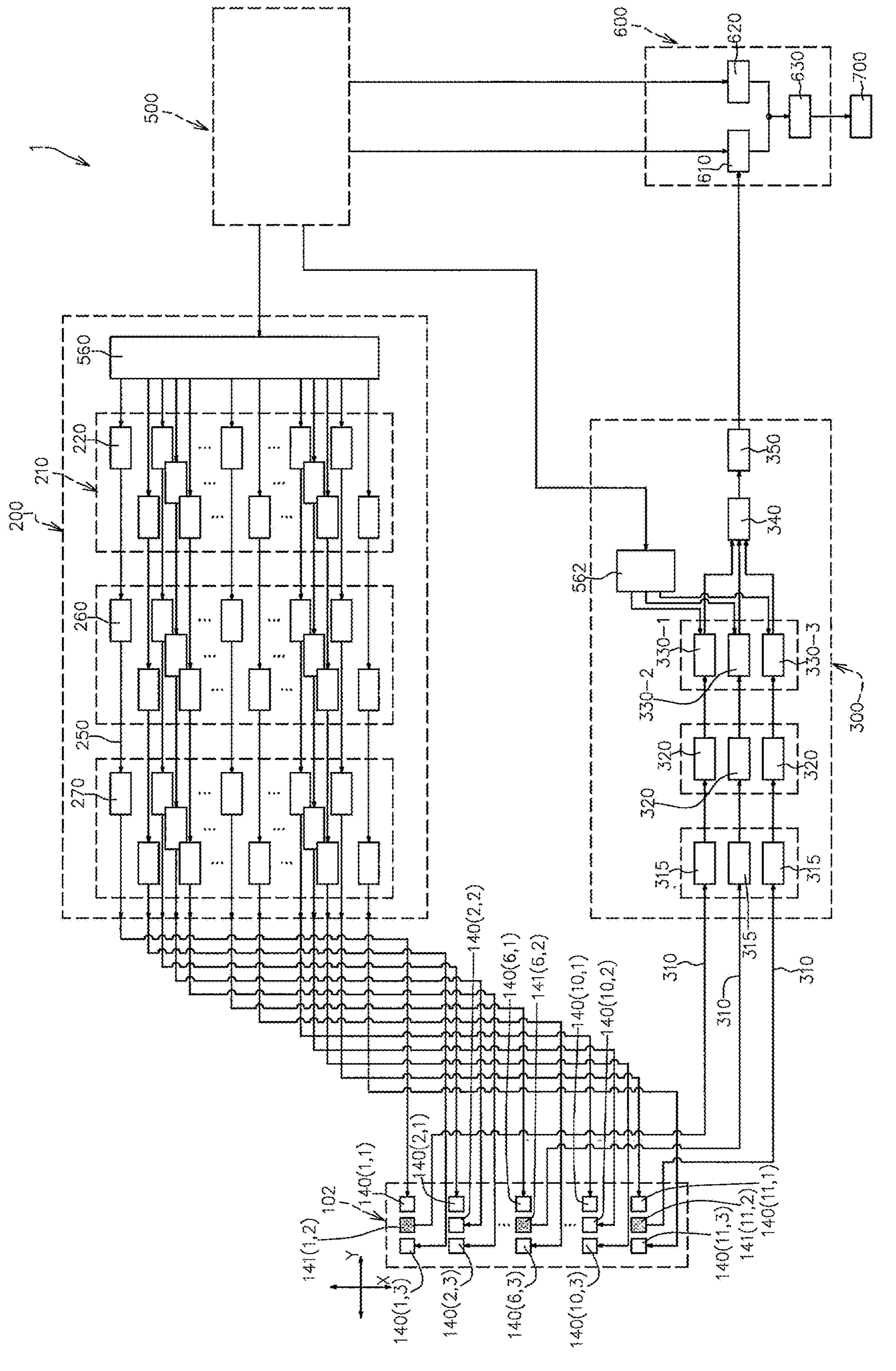
FIG. 12 is a schematic block diagram of a phased array sensor according to a third embodiment of the present invention.

FIG. 12 illustrates a schematic block diagram of a phased array sensor 1 according to the present embodiment.

As shown in FIG. 2, the phased array sensor 1 includes the air-coupled ultrasonic transducer array 102, a transmission-side unit 200, a reception-side unit 300, a control device 500 and a detection device 600.

Figure 13:
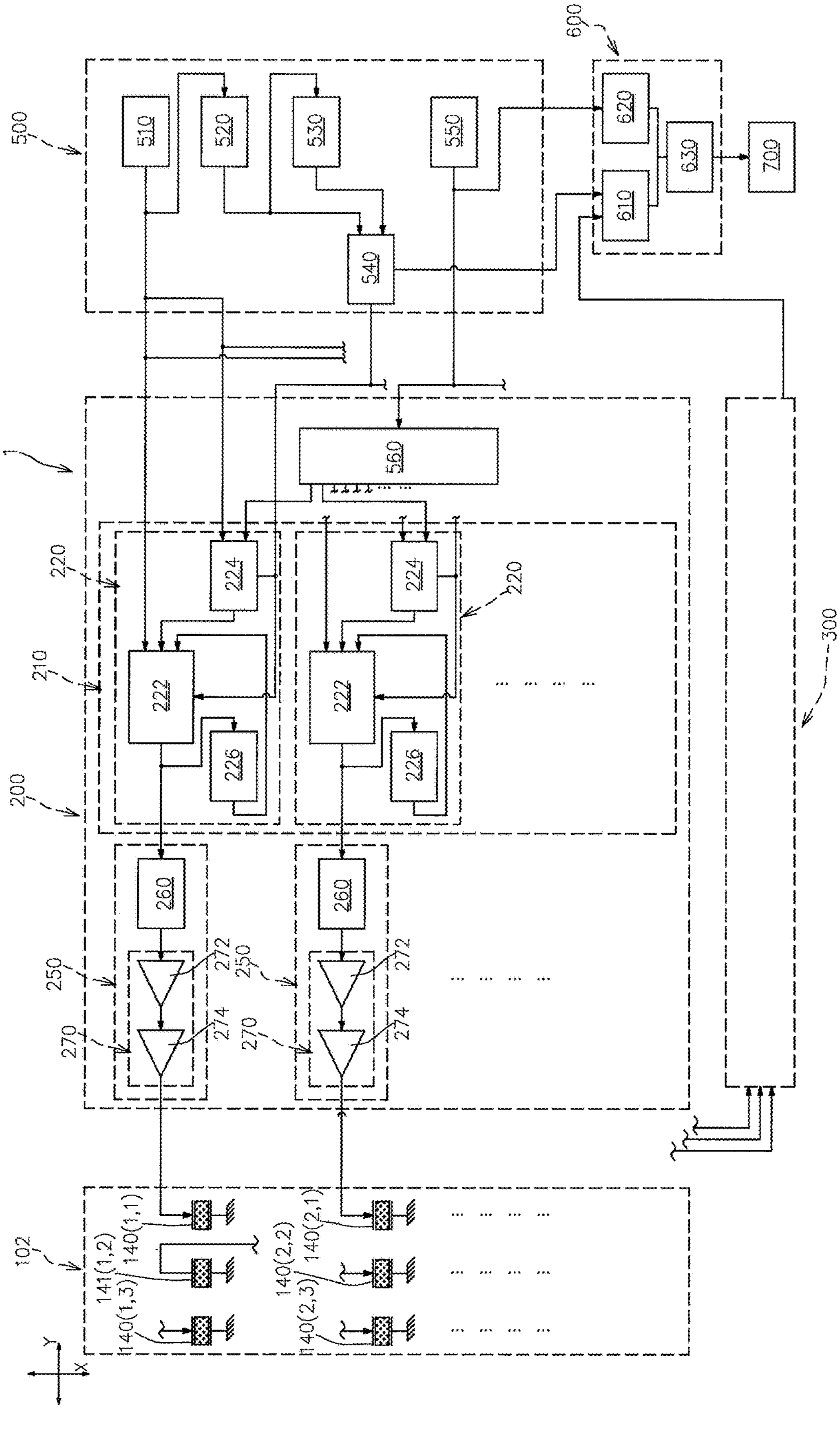
FIG. 13 is a schematic block diagram of a control device and a transmission-side unit in the phased array sensor.
Figure 14:
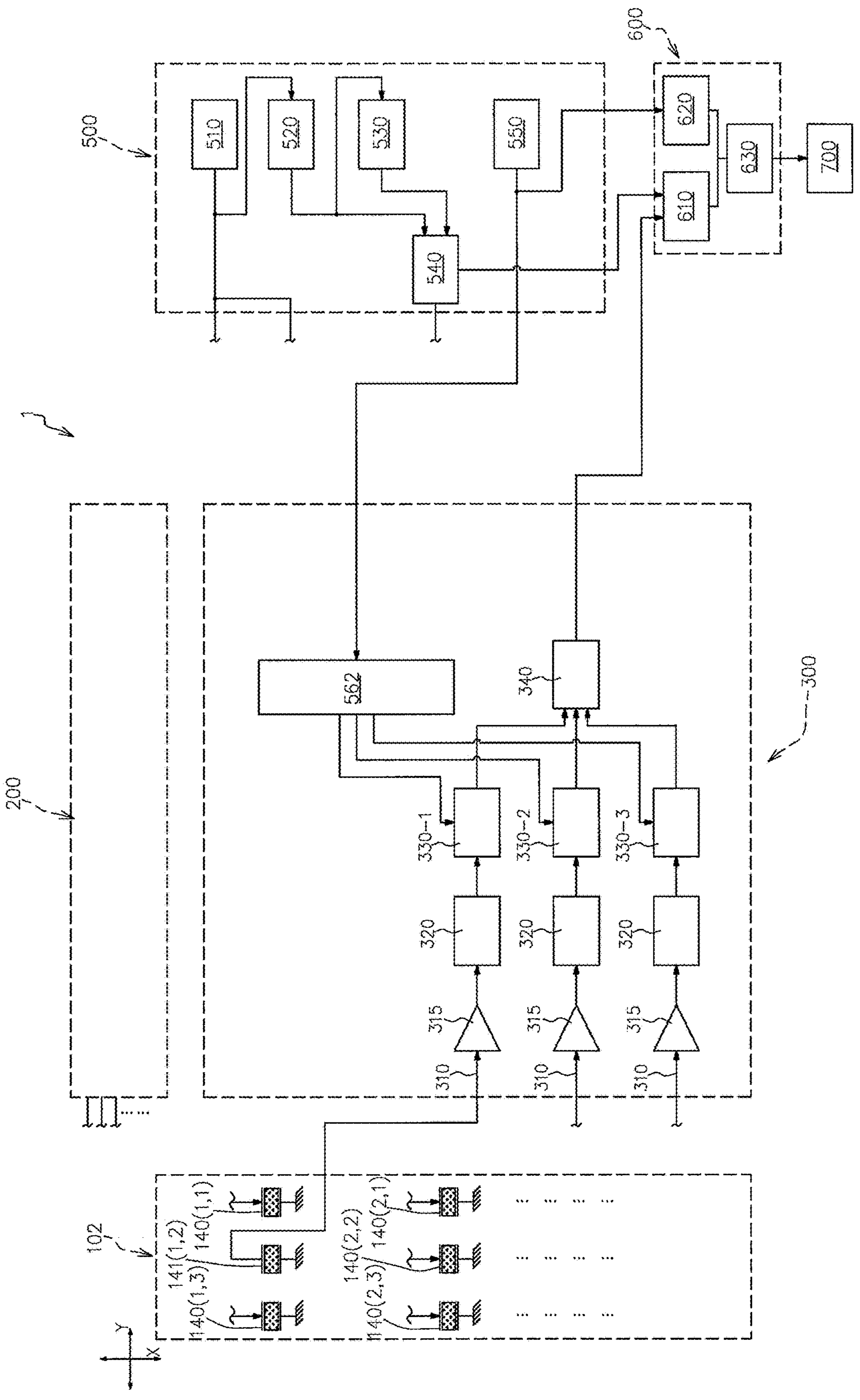
FIG. 14 is a schematic block diagram of the control device and a reception-side unit in the phased array sensor.

FIG. 13 illustrates a schematic block diagram of the control device 500 and the transmission-side unit 200, and FIG. 14 illustrates a schematic block diagram of the control device 500 and the reception-side unit 300.

First, the control device 500 and the transmission-side unit 200 will be explained.

Figure 15:
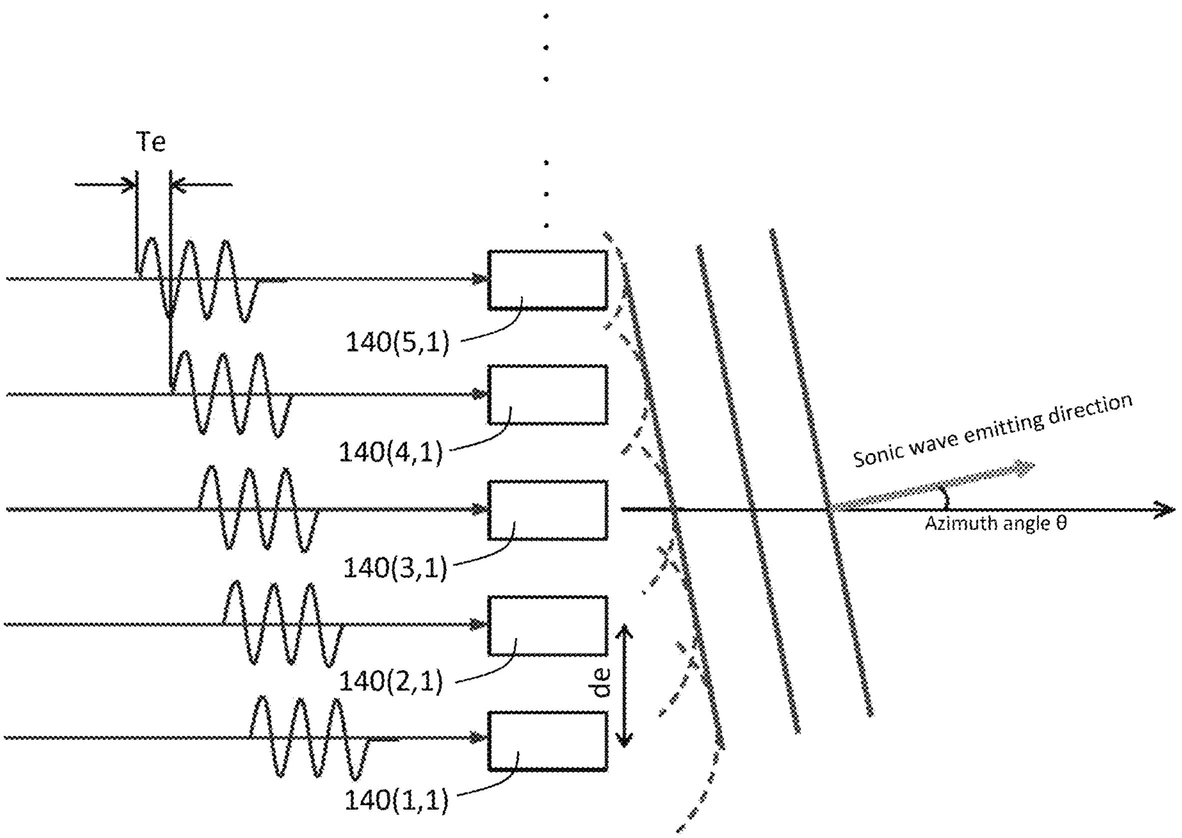
FIG. 15 is a schematic diagram for explanation of operation in which the transducer array, which includes the plurality of transmission piezoelectric elements arranged along a scanning direction (an X-direction), radiates ultrasonic waves in response to a driving voltage signal supplied from the transmission-side unit.

FIG. 15 illustrates a schematic diagram for explanation of operation in which the transducer array 102 radiates ultrasonic waves in response to a driving voltage signal supplied from the transmission-side unit 200, the transducer array 102 including the plurality of transmission piezoelectric elements arranged along a scanning direction (for example, the X-direction).

In FIG. 15 the is a delay time between a burst wave driving voltage signal applied to one transmission piezoelectric element (for example, the transmission piezoelectric element 140(1, 1)) and a burst wave driving voltage signal applied to the adjacent transmission piezoelectric element (for example, the transmission piezoelectric element 140(2, 1)), and is calculated by $$\tau e=(de\times\sin\theta)/c.$$

Herein, θ denotes the azimuth angle of the ultrasonic wave emitted from the transducer array 101, de denotes an arrangement pitch or interval between adjacent transducers, and c denotes the sonic speed.

As described above, the arrangement pitch de is set to be equal to or less than half the wavelength λ of the ultrasonic waves radiated by the transmission transducers that are formed by the transmission piezoelectric elements 140, in order to suppress the occurrence of grating lobes.

The wavelength λ of the ultrasonic wave with a frequency of 40 kHz in air at temperature 20° C. is 8.6 mm. Therefore, the arrangement pitch de is set to 8.6 mm/2=4.3 mm or less.

As illustrated in FIG. 13, the control device 500 includes:

a clock signal generating circuit 510 that generates a clock signal with a period of, for example, 0.1 usec to determine the operation timing of a digital circuit;

a time unit setting counter circuit 520 that reduces the frequency of the clock signal generated by the clock signal generating circuit 510 to an appropriate time interval, for example 0.1 msec, to set a burst wave period;

a burst interval counter circuit 530 that generates pulses at intervals of the generation timings of the burst wave driving voltage signals to be transmitted to the plurality of transmission piezoelectric elements 140;

an active counter circuit 540 outputs an active pulse signal having a time width corresponding to the total time width of the burst wave driving voltage signal to be generated on the basis of signals from the time unit setting counter circuit 520 and the burst interval counter circuit 530; and an azimuth angle control part 550 that outputs an azimuth angle signal representing the azimuth angle θ of the ultrasonic wave emitted by the transducer array 102.

As illustrated in FIGS. 12 and 13, the transmission-side unit 200 has a transmission signal generation device 210 including a plurality of (thirty in the illustrated embodiment) signal generating means 220 that generate driving voltage signals for the plurality of (thirty in the illustrated embodiment) transmission piezoelectric elements 140, respectively, a delay time control unit 560 that calculates the delay time the on the basis of the azimuth angle signal sent from the azimuth angle control part 550 and outputs corresponding delay control signals to the plurality of signal generating means 210, and a plurality of transmission-side channels 250 that transmit the driving voltage signals generated by the plurality of signal generating means 210 to the plurality of transmission piezoelectric elements 140, respectively.

In a preferable configuration, the transmission signal generation device 210 is configured to apply, to the transmission piezoelectric elements 140(1, 1) and 140(1, 3) adjacent to the reception piezoelectric element 141 in Y-direction orthogonal to the scanning direction (X-direction in the illustrated embodiment), the driving voltage signal having an amplitude (for example, 15 V) larger than an amplitude (for example, 10 V) of the driving voltage signal applied to the other transmission piezoelectric elements.

The preferable configuration makes it possible to effectively prevent or reduce deterioration of radiation characteristics of the sonic wave caused by replacing a part of the plurality of piezoelectric elements (three out of thirty-three piezoelectric elements in the present embodiment) with the reception piezoelectric elements 141.

As illustrated in FIG. 13, the signal generating means 220 has a frequency divider 222, a delay time counter circuit 224, and a wave number counter circuit 226.

The frequency divider 222 divides the clock signal from the clock signal generating circuit 510 to generate a rectangular burst wave driving voltage signal with a predetermined frequency.

When the delay time counter circuit 224 is activated by an active pulse signal from the active counter circuit 540, the delay time counter circuit 224 sends a start signal pulse to the frequency divider 222 in accordance with the delay time specified by the delay control signal from the delay time control unit 560, so that the frequency divider 222 starts outputting a rectangular burst wave driving voltage signal.

The wave number counter circuit 226 sends a stop signal pulse to the frequency divider 222 when the wave number of the rectangular burst wave driving voltage signal output from the frequency divider 222 reaches a predetermined wave number.

As illustrated in FIGS. 12 and 13, in the present embodiment, the transmission-side unit 200 further includes a plurality of transmission-side filters 260 that are inserted in the plurality of transmission-side channels 250, respectively.

The transmission-side filters 260 are configured to remove at least resonant frequency components of the transmission transducers while allowing driving frequency components to pass through.

The transmission-side filters 260 may be low-pass filters or band-pass filters configured to remove the resonant frequency components of the transmission transducers while allowing the driving frequency components to pass through, or band-reject filters that remove only the resonant frequencies of the transducers in a pinpoint manner.

In a configuration in which the transmission-side filters 260 are bandpass filters, the bandpass filters are preferably configured to pass only frequency components within ±10% of the driving frequency.

With this configuration, it is possible to effectively remove or reduce the resonant frequency (e.g., 70 kHz) components of the non-resonant transmission transducers while effectively passing the driving frequencies (30 to 50 kHz) required for detecting an object several meters ahead.

For example, in a case where the ultrasonic phased array sensor 1 according to the present embodiment is mounted on a device such as a service robot whose maximum relative speed difference v with respect to an obstacle is about 10 km/h (=2.78 m/sec), $$\Delta f/f \approx \text{(approximately equal)} \pm v/c = \pm 0.00808 (= \pm 0.808\%)$$

is established.

Herein, f denotes the frequency of the ultrasonic wave, Δf denotes frequency fluctuation due to the Doppler effect, and c denotes the sonic speed.

Therefore, when the bandpass filters used as the transmission-side filters 260 are configured to pass only frequency components within ±1% of the driving frequency, it is possible to detect a speed of the obstacle within a certain degree of accuracy by detecting frequency fluctuation of the received sonic waves due to the Doppler effect.

By causing the rectangular burst wave driving voltage signals to pass through the transmission-side filters 260, the rectangular burst wave driving voltage signals are converted to sine burst wave driving voltage signals (see FIG. 15) with the same fundamental frequency.

In this embodiment, as illustrated in FIGS. 12 and 13, the transmission-side unit 200 has power amplifier circuits 270 inserted in the transmission-side channels 250 downstream of the transmission-side filters 260 in the signal transmission direction.

The power amplifier circuit 270 includes a buffer circuit 272 and an amplifier circuit 274.

Next, the reception-side unit 300 will be described.

As illustrated in FIGS. 12 and 14, the reception-side unit 300 has a plurality of (three in the present embodiment) reception-side channels 310 capable of receiving reception voltage signals generated by the plurality of (three in the present embodiment) reception piezoelectric elements 141, and a plurality of (three in the present embodiment) envelope detectors 320 inserted in the plurality of reception-side channels 310, respectively.

The envelope detector 320 generates an envelope detecting signal having a width corresponding to a duration (a time width of the whole of the signal) of the reception voltage signal transmitted through the reception-side channel 310 from the corresponding reception piezoelectric element 141.

The envelope detector 320 includes a circuit converting the envelope detecting signal to a pulse waveform.

Figure 16:
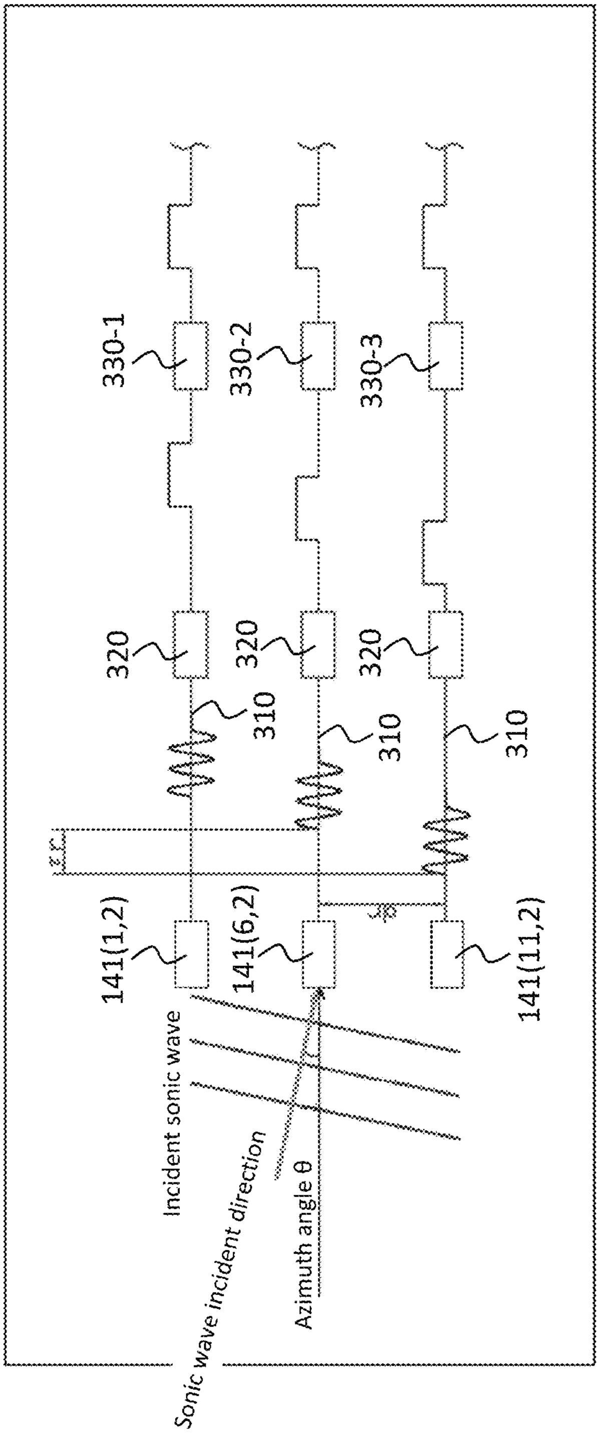
FIG. 16 is a schematic diagram of reception voltage signal processing performed by the reception-side unit.

In the present embodiment, as illustrated in FIGS. 12, 14 and 16, the reception-side unit 300 further includes a plurality of (three in the present embodiment) low-noise amplifier circuits 315 inserted in the plurality of reception-side channels 310, respectively, on an upstream side of the plurality of envelope detectors 320 in the signal transmission direction.

FIG. 16 illustrates a schematic diagram of reception voltage signal processing performed by the reception-side unit 300.

Figures 17A, 17B, 17C:
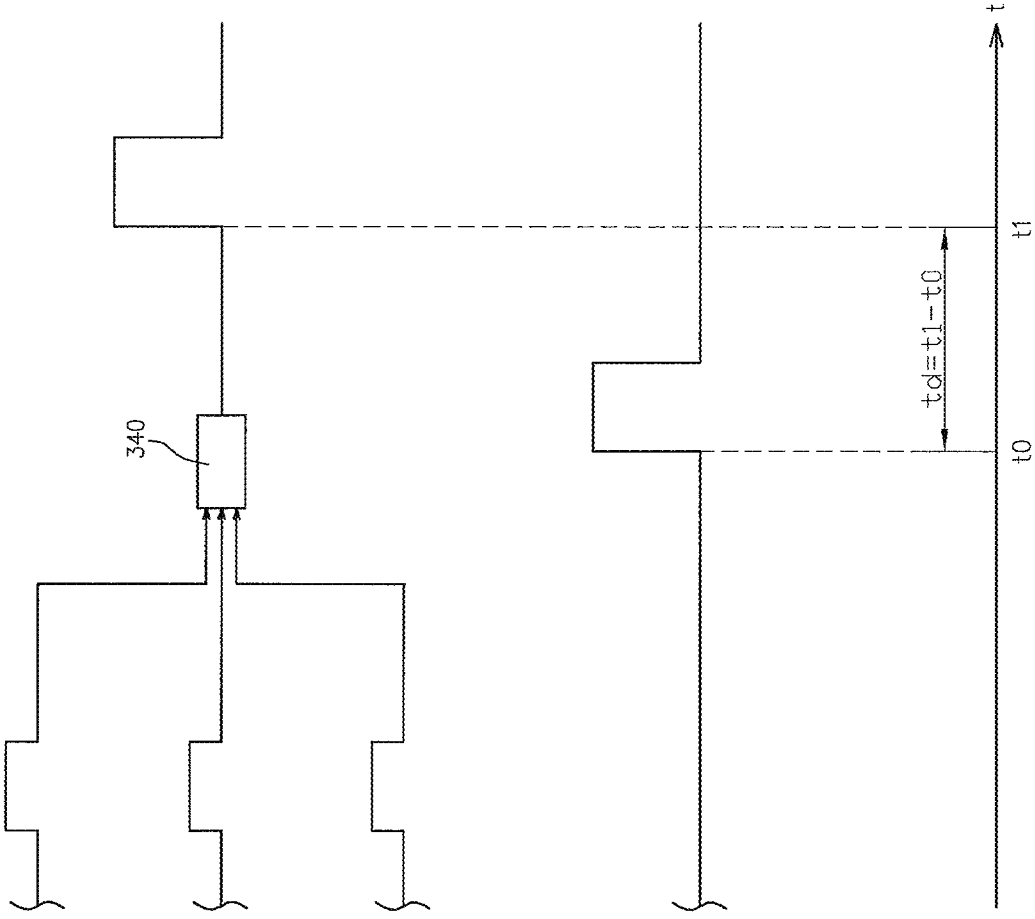
FIG. 17A is a schematic diagram of reception voltage signal processing following the processing of FIG. 16.
FIG. 17B illustrates a reception timing signal of a reception voltage signal generated on the basis of an output of an adder circuit.
FIG. 17C illustrates a transmission timing signal of a driving voltage signal generated on the basis of a signal sent from the control device.

FIG. 17A illustrates a schematic diagram of reception voltage signal processing following the processing of FIG. 16.

In a case where the transducer array 102 includes a plurality of the reception transducers as in the present embodiment, the reception-side unit 300 further includes a plurality of (three in the illustrated embodiment) delay circuits 330 inserted in the plurality of reception-side channels 310, respectively, on a downstream side of the plurality of envelope detectors 320 in the signal transmission direction, the delay circuits 330 capable of delaying the reception voltage signals by corresponding predetermined times, and an adder circuit 340 that adds output signals of the plurality of delay circuits 330.

The delay times of the plurality of delay circuits 330 are set such that, among the reception voltage signals generated by the plurality of reception transducers in response to reception of the ultrasonic wave by the corresponding reception piezoelectric element 141, only the reception voltage signals due to return ultrasonic waves at the azimuth angle θ, at which the transmission transducers radiate the ultrasonic waves, that are reflected back from an obstacle at the azimuth angle θ are matched on the time axis.

Specifically, the plurality of delay circuits 330 delay respective reception voltage signals by delay times based on respective delay control signals transmitted from a reception delay time control part 562 that is provided in the reception-side unit 300.

The delay time control part 562 calculates the respective delay times τr for the plurality of reception-side channels 310 on the basis of the azimuth angle signals sent from the azimuth angle control part 550 and delays respective reception voltage signals by the respective delay times for the plurality of reception-side channels 310.

In the example illustrated in FIG. 16, a delay time of a third delay circuit 330-3, which delays a reception voltage signal from a third reception piezoelectric element 141(11, 1), is set to zero, and a delay time τr of a second delay circuit 330-2, which delays a reception voltage signal from a second reception piezoelectric element 141(6, 2), is calculated by $$\tau r = (dr \times \sin\theta)/c$$

with the reception voltage signal from the third reception piezoelectric element 141(11, 1) as a reference.

Herein, dr denotes an arrangement interval (dr=5×de in the present embodiment) between the second reception piezoelectric element 141(6, 2) and the adjacent third reception piezoelectric element 141(11, 1), θ denotes the azimuth angle, and c denotes the sonic speed.

A delay time of a first delay circuit 330-1, which delays a reception voltage signal from a first reception piezoelectric element 141(1, 2), is set to a time τr with respect to the reception voltage signal from the adjacent second reception piezoelectric element 141(6, 2), that is, a time $2\tau r$ with respect to the reception voltage signal from the third reception piezoelectric element 141(11, 1).

As illustrated in FIG. 17A, the adder circuit 370 adds reception voltage signals of the plurality of reception-side channels 310 whose time axes are aligned by the plurality of delay circuits 330.

According to this configuration, it is possible to effectively avoid false recognition of a virtual image where an object existing in the direction other than the azimuth angle θ at which the ultrasonic wave is radiated is detected as an obstacle existing at the azimuth angle θ.

As described above, the phased array sensor 1 according to the present embodiment includes the transducer array 102 according to the second embodiment including the plurality of reception piezoelectric elements 141. Alternatively, it is possible to include the transducer array 101 according to the first embodiment including the single reception piezoelectric element 140.

Figure 18:
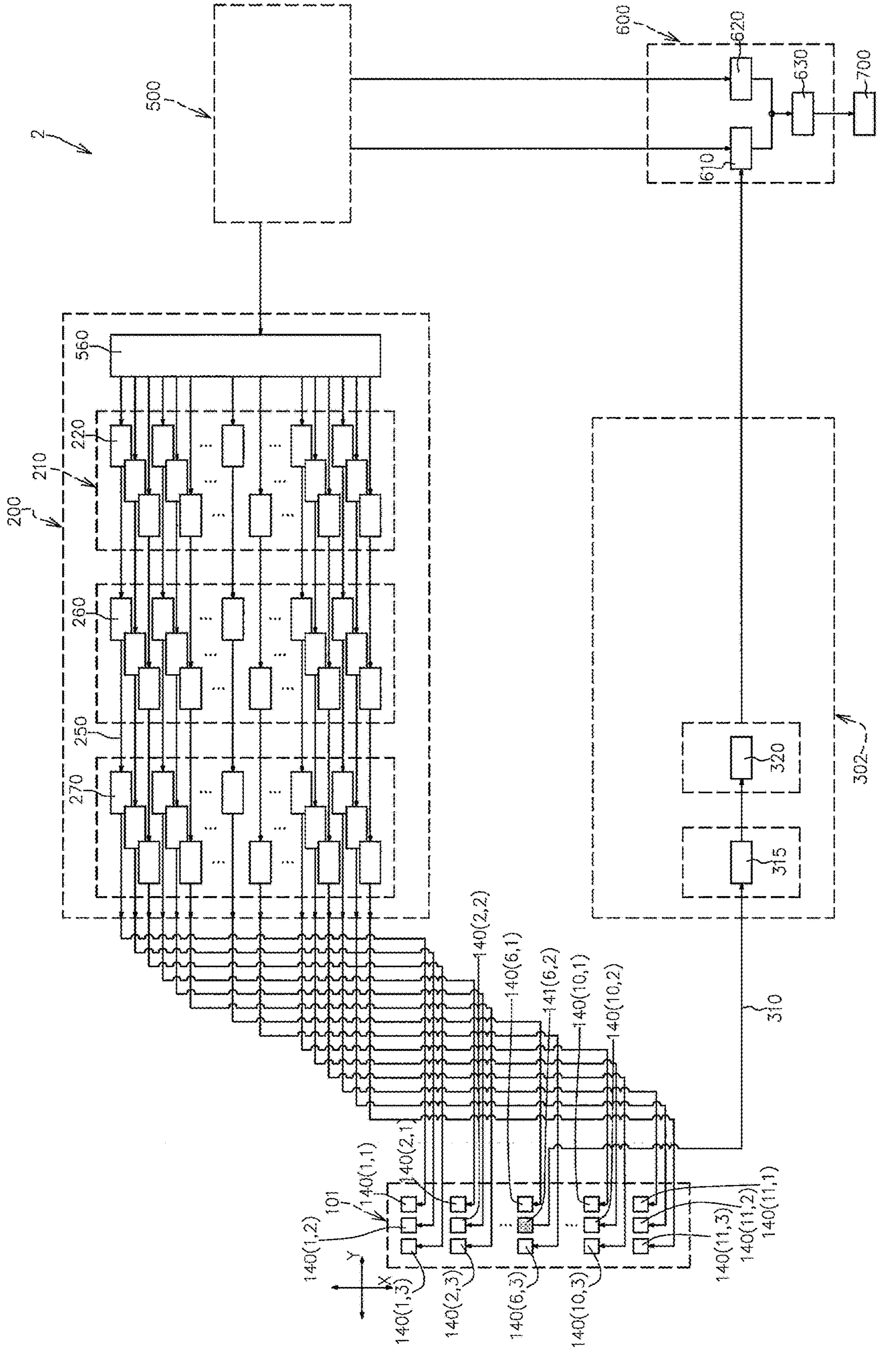
FIG. 18 is a schematic block diagram of a phased array sensor according to a first modified example of the third embodiment.

FIG. 18 illustrates a schematic block diagram of a phased array sensor 2 according to a first modified example of the present embodiment, the phased array sensor 2 including the transducer array 101 according to the first embodiment.

As illustrated in FIG. 18, the phased array sensor 2 includes the transducer array 101 and a reception-side unit 302 in place of the transducer array 102 and the reception-side unit 300, in comparison with the phased array sensor 1 according to the present embodiment.

The reception-side unit 302 is configured so that the delay circuits 330, the reception delay time control part 562 and the adder circuit 340 are omitted in comparison with the reception-side unit 300.

Since the phased array sensor 2 according to the first modified example includes only one reception transducer that receives the return ultrasonic wave, the phased array sensor 2 may detect, in addition to an obstacle based on the return ultrasonic wave at the azimuth angle θ, a virtual image based on multiple reflected ultrasonic waves that are reflected back from the obstacle and then reflected by other obstacles in other directions.

Regarding this point, the phased array sensor 1 according to the present embodiment including the plurality of reception transducers makes it possible to match, with respect to the time axis, only the reception voltage signals due to the return ultrasonic waves at the azimuth angle θ that are radiated toward the azimuth angle θ and reflected back by an obstacle present at the azimuth angle θ, thereby effectively avoiding detection of a virtual image.

The envelope detector 320 may include a variable gain amplifier (not illustrated) and a logarithmic amplifier (not illustrated) on an upstream side of the circuit that performs envelope detection.

The variable gain amplifier is configured such that the amplification gain increases as a time difference from the emission of ultrasonic waves from the transducer array 102 (101) by the driving voltage signals from the transmission-side unit 200 until the reception of the return ultrasonic waves by the transducer array 102 (101) increases.

The variable gain amplifier is provided in consideration that the farther an obstacle is, the greater the attenuation of the return ultrasonic waves is and the smaller the amplitude of the reception voltage signals is.

The logarithmic amplifier is configured so as to cause a gain for small amplitude signals to be increased and also cause a gain for large amplitude signals to be reduced.

That is, in order to amplify small amplitude signals in the reception voltage signal, it is necessary to set the gain large. However, when the gain setting is the same for all reception voltage signals, large amplitude signals saturate and distortion occurs.

The logarithmic amplifier can prevent such inconvenience, expand an amplitude range of signals that can be amplified, and effectively suppress distortion of an output signal of the detector.

As illustrated in FIGS. 12 to 14 and 18, the detection device 600 has a time difference detection unit 610, an orientation detection unit 620, and a position detection unit 630.

The time difference detection unit 610 is configured to detect a time difference td (td=t1−t0 in the examples of FIGS. 17A and 17B) between a transmission timing signal (FIG. 17B) based on a driving voltage signal sent from the control device 500 and a reception timing signal (FIG. 17A) based on a reception voltage signal sent from the reception-side unit 300 (302). The timing t1 which the reception timing signal is generated is a point in time at which the reception voltage signal from the envelope detector 320 exceeds a predetermined threshold value.

The orientation detection unit 620 is configured to recognize the azimuth angle θ at which the transducer array 102 (101) radiates the ultrasonic waves, on the basis of the azimuth angle information sent from the control device 500.

The position detection unit 630 identifies the position of an obstacle on the basis of a distance to the obstacle calculated based on a detection result of the time difference detection unit 610, and the azimuth angle of the obstacle recognized by the orientation detection unit 620.

As illustrated in FIGS. 12 to 14 and 18, the phased array sensor 1 (2) further has a display device 700 that displays position information of the obstacle identified by the detection device 600.

Since, in the present embodiment, delay processing and addition processing of the reception signals in the reception-side channels 310 are performed after the signals have been subjected to envelope detection, as described above, no grating lobes is generated in azimuthal angle distribution of reception sensitivity. So, even if the reception piezoelectric element 141 forming the reception transducer is of a resonant type, there is no affection by "dispersion" or "variation" in the resonant frequency among the plurality of reception transducers. Accordingly, it is possible to arbitrarily set the arrangement interval dr of the reception transducers (the reception piezoelectric elements 141, and it is advantageous to set the dr to be larger in order to increase azimuth resolution.

Considering this point, in the present embodiment, out of the three reception piezoelectric elements 141, the first reception piezoelectric element 141(1, 2) is positioned at an end on one side in the scanning direction (X-direction), the second reception piezoelectric element 141(6, 2) is positioned at the center in the scanning direction (X-direction), and the third reception piezoelectric element 141(11, 2) is positioned at an end on the other side in the scanning direction (X-direction), In the present embodiment (see FIGS. 12 and 13) and the first modified example, the transmission-side unit 200 includes the plurality of signal generating means 220 whose number corresponds to the number of the plurality of transmission piezoelectric elements 140, so that the driving voltage signals are supplied to the plurality of transmission piezoelectric elements 140 from the respective exclusive signal generating means 220. Alternatively, it is possible to modify so that the driving voltage signals are supplied to the transmission piezoelectric elements out of the plurality of transmission piezoelectric elements 140 that are arranged at the same position in the scanning direction (X-direction) from a common signal generating means 220.

Figure 19:
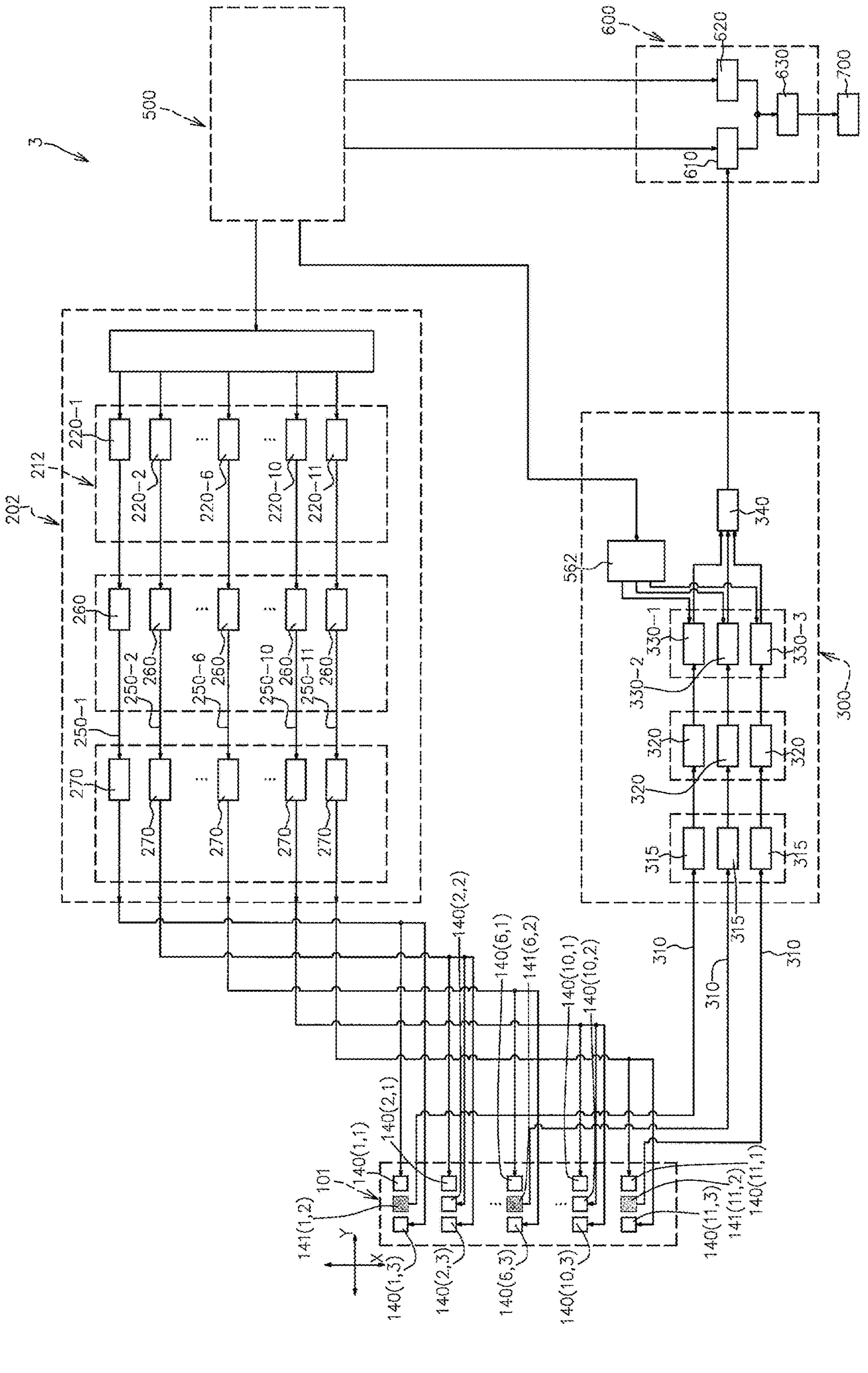
FIG. 19 is a schematic block diagram of a phased array sensor according to a second modified example of the third embodiment.

FIG. 19 illustrates a schematic block diagram of a phased array sensor 3 according to a second modified example having such a modified configuration.

As illustrated in FIG. 19, the sensor 3 according to the second modified example includes a transmission-side unit 202 in place of the transmission-side unit 200, in comparison with the sensor 1 according to the present embodiment.

The transmission-side unit 202 includes the plurality of signal generating means 220 provided for every one or every group of a plurality of transmission piezoelectric elements, out of the transmission piezoelectric elements 140 in the transducer array (the transducer array 102 in the illustrated configuration) cooperating with the transmission-side unit 202, that is or are arranged at the same position in the scanning direction (X-direction).

The sensor 3 illustrated in FIG. 19 includes the transducer array 101 according to the first embodiment, and the array 101 has eleven of first to eleventh positions in the scanning direction (X-direction) with respect to the arrangement of the plurality of transmission piezoelectric elements 140.

Accordingly, the transmission-side unit includes a transmission signal generation device 212 having eleven eleventh signal generating means that include the first to eleventh signal generating means 220-1 to 220-11, and first to eleventh transmission-side channels 250-1 to 250-11 transmitting driving voltage signals, which are generated by the first to eleventh signal generating means 220-1 to 220-11, to the transmission piezoelectric elements 140 that are arranged at the corresponding scanning direction (X-direction) positions, respectively.

As in the transmission-side unit, the transmission-side filter 260 and the power amplifier circuit 270 are inserted in series in each of the first to eleventh transmission-side channels 250-1 to 250-11.

1-3 phased array sensor
101, 102 transducer array
110A reference X-direction row
110(1), (2) first and second adjacent X-direction rows
120 support plate
121 first surface of support plate
122 second surface of support plate
125*a* transmission through-hole
125*b* reception through-hole
126*a, b* recess
127*a, b* waveguide
128*a, b* tubular portion
129*a, b* horn portion
130 flexible resin film
140 transmission piezoelectric element
141 reception piezoelectric element
150 lower sealing plate
180 wiring assembly
182 insulating base layer
185 conductive layer
185*a, b* transmission first and second electrode wirings
186*a, b* reception first and second electrode wirings
189 bump
210 transmission signal generation device
320 envelope detector
330 delay circuit
340 adder circuit
500 control device
600 detection device

The invention claimed is:

1. An ultrasonic transducer array comprising:

a rigid support plate having a first surface on one side and a second surface on the other side in a thickness direction, the rigid support plate being provided with a through-hole group including a plurality of through-holes penetrating between the first and second surfaces;

a flexible resin film fixed to the first surface of the support plate in such a way as to cover the plurality of through-holes; and a plurality of piezoelectric elements whose number is same as a number of the plurality of through-holes, the piezoelectric elements being fixed to the flexible resin film in such a way that a middle portion thereof overlaps, in a plan view, the corresponding through-hole and a peripheral portion thereof overlaps, in a plan view, the first surface of the support plate, wherein the plurality of piezoelectric elements include a plurality of transmission piezoelectric elements forming transmission transducers that generate ultrasonic waves in response to application of a driving voltage signal having a predetermined driving frequency, and one or a plurality of reception piezoelectric elements forming one or a plurality of reception transducers that generate reception voltage signals in response to reception of ultrasonic waves, and wherein the transmission transducer is of a non-resonant type that generates ultrasonic waves without performing resonant vibration in response to application of the driving voltage signal having the predetermined driving frequency, and the reception transducer is of a resonant type that performs resonant vibration in response to receipt of an ultrasonic wave having a frequency corresponding to the driving frequency.

2. The ultrasonic transducer array according to claim 1, wherein the through-hole group has an X-direction row formed by m (m is an integer of 3 or higher) pieces of the through-holes that are arranged at a predetermined X-direction array pitch in an X-direction in an X-Y plane of the support plate.

3. The ultrasonic transducer array according to claim 2, wherein the through-hole group includes a reference X-direction row, and one or a plurality of parallel X-direction rows arranged in a Y-direction of the reference X-direction row at a predetermined Y-direction array pitch, wherein the one or the plurality of reception piezoelectric elements are arranged so as to cover, in a plan view, one or a plurality of through-holes forming the reference X-direction row, and wherein a transmission piezoelectric element, out of the plurality of transmission piezoelectric elements, that is adjacent to the reception piezoelectric element in the Y-direction is thinner than the other transmission piezoelectric elements.

4. The ultrasonic transducer array according to claim 3, wherein the parallel X-direction rows include first and second adjacent X-direction rows that are adjacent to the reference X-direction row on one side and the other side in the Y-direction of the reference X-direction row, respectively, at the predetermined Y-direction array pitch, and wherein transmission piezoelectric elements, out of the plurality of transmission piezoelectric elements, that are adjacent to the reception piezoelectric element on one side and the other side in the Y-direction are thinner than the other transmission piezoelectric elements.

5. The ultrasonic transducer array according to claim 3, wherein the X-direction array pitch and the Y-direction array pitch are same to each other.

6. The ultrasonic transducer array according to claim 3, wherein the reception piezoelectric element is arranged so as to be symmetrical with respect to a center in the X-direction of the X-direction row.

7. The ultrasonic transducer array according to claim 2, wherein each of the through-holes includes a recess opened to the first surface of the support plate and a waveguide having a first end on one end side that has an opening width smaller than the recess and is opened to a bottom surface of the recess and a second end on the other end side that is opened to the second surface of the support plate.

8. The ultrasonic transducer array according to claim 7,
wherein the waveguide includes a tubular portion having the first end that is opened to the bottom surface of the recess and a horn portion having the second end that is opened to the second surface of the support plate,
wherein the tubular portion has an opening width that is smaller than that of the recess and is constant throughout a thickness direction, and
wherein the horn portion is formed to have an opening width that increases as being close to a distal end side opened to the second surface of the support plate from a proximal end side connected to the tubular portion.

9. The ultrasonic transducer array according to claim 2, wherein the transmission piezoelectric element is of a multilayer laminated type and the reception piezoelectric element is of a single-layer type.

10. The ultrasonic transducer array according to claim 1, wherein the reception piezoelectric element is thinner than the transmission piezoelectric element.

11. The ultrasonic transducer array according to claim 10 further comprising:
a lower sealing plate that is thicker than the transmission piezoelectric elements and has a plurality of piezoelectric-element-directed openings each having size sufficient to surround a corresponding one of the plurality of piezoelectric elements, the lower sealing plate being fixed to the flexible resin film so that the plurality of piezoelectric elements are located within the respective piezoelectric-element-directed openings in a plan view, and
a wiring assembly fixed to the lower sealing plate,
wherein the wiring assembly has an insulating base layer, a conductive layer including a transmission wiring and a reception wiring provided on the base layer, and an insulating cover layer surrounding the conductive layer,
wherein the base layer is formed with a transmission connection opening exposing a connection region of the transmission wiring that is connected to an electrode of the transmission piezoelectric element, and a reception connection opening exposing a connection region of the reception wiring that is connected to an electrode of the reception piezoelectric element, and
wherein the connection region of the reception wiring is provided with a bump extending outward through the reception connection opening.

12. An ultrasonic phased array sensor comprising:
an ultrasonic transducer array including a rigid support plate that has a first surface on one side and a second surface on the other side in a thickness direction, the rigid support plate being provided with a through-hole group including a plurality of through-holes penetrating between the first and second surfaces, a flexible resin film that is fixed to the first surface of the support plate in such a way as to cover the plurality of through-holes, and a plurality of piezoelectric elements whose number is same as a number of the plurality of through-holes, the piezoelectric element being fixed to the flexible resin film in such a way that a middle portion thereof overlaps, in a plan view, the corresponding through-hole and a peripheral portion thereof overlaps, in a plan view, the first surface of the support plate, wherein the through-hole group has an X-direction row formed by m (m is an integer of 3 or higher) pieces of the through-holes that are arranged at a predetermined X-direction array pitch in an X-direction in an X-Y plane of the support plate, wherein the plurality of piezoelectric elements include a plurality of transmission piezoelectric elements forming transmission transducers that generate ultrasonic waves in response to application of a driving voltage signal having a predetermined driving frequency and a plurality of reception piezoelectric elements forming a plurality of reception transducers that generate reception voltage signals in response to reception of ultrasonic waves;
a transmission signal generation device that generates sine burst wave driving voltage signals for applying the plurality of transmission piezoelectric elements at delay times respectively corresponding to the plurality of transmission piezoelectric elements, the driving voltage signal having the predetermined driving frequency lower than a resonance frequency of the transmission transducer;
a plurality of detectors that generate detecting signals with widths corresponding to durations of the reception voltage signals respectively generated by the plurality of the reception piezoelectric elements;
a plurality of delay circuits capable of delaying the reception voltage signals, which are respectively generated by the plurality of detectors, by respective predetermined times;
an adder circuit that adds output signals of the plurality of delay circuits and outputs an added reception voltage signal;
a control device that performs control with respect to the transmission signal generation device and the delay circuits; and
a detection device that identifies a position of an obstacle on the basis of a time difference between a transmission timing signal based on the driving voltage signal sent from the control device and a reception timing signal based on the added reception voltage signal sent from the adder circuit, and an azimuth angle sent from the control device,
wherein the transmission transducer is of a non-resonant type that generates an ultrasonic wave without performing resonant vibration in response to application of the driving voltage signal having the driving frequency, and the reception transducer is of a resonant type that performs resonant vibration in response to receipt of an ultrasonic wave having a frequency corresponding to the driving frequency.

13. The ultrasonic phased array sensor according to claim 12, wherein the through-hole group includes a reference X-direction row, and one or a plurality of X-direction rows arranged in the Y-direction of the reference X-direction row at a predetermined Y-direction array pitch,
wherein the plurality of reception piezoelectric elements are arranged so as to cover, in a plan view, corresponding through-holes out of the plurality of through-holes forming the reference X-direction row, and
wherein the transmission signal generation device is configured to make an amplitude of the driving voltage signal applied to the transmission piezoelectric elements, out of the plurality of the transmission piezoelectric elements, that are adjacent to the plurality of reception piezoelectric elements in the Y-direction larger than that of the driving voltage signal applied to the remaining transmission piezoelectric elements.

14. The ultrasonic phased array sensor according to claim 13, wherein the through-hole group includes first and second adjacent X-direction rows that are adjacent to the reference X-direction row on one side and the other side in the Y-direction of the reference X-direction row, respectively, at the predetermined Y-direction array pitch, and wherein the transmission signal generation device is configured to make an amplitude of the driving voltage signal applied to the transmission piezoelectric elements, out of the transmission piezoelectric elements, that are adjacent to the reception piezoelectric element on one side and the other side in the Y-direction larger than that of the driving voltage signal applied to the remaining transmission piezoelectric elements.

15. The ultrasonic phased array sensor according to claim 12, wherein the through-hole group includes a reference X-direction row, and wherein the plurality of reception piezoelectric elements are arranged so as to cover, in a plan view, the through-holes at ends on one side and the other side in the X-direction of the reference X-direction row.

16. The ultrasonic phased array sensor according to claim 12, wherein the through-hole group includes a reference X-direction row, and one or a plurality of X-direction rows arranged in the Y-direction of the reference X-direction row at a Y-direction array pitch, wherein the plurality of reception piezoelectric elements are arranged so as to cover, in a plan view, corresponding through-holes, out of the plurality of through-holes, that form the reference X-direction row, and wherein the transmission signal generation device includes a plurality of signal generating means respectively provided for the plurality of transmission piezoelectric elements.

17. The ultrasonic phased array sensor according to claim 12, wherein the through-hole group includes a reference X-direction row, and one or a plurality of X-direction rows arranged in the Y-direction of the reference X-direction row at a predetermined Y-direction array pitch, wherein the plurality of reception piezoelectric elements are arranged so as to cover, in a plan view, corresponding through-holes, out of the plurality of through-holes, that form the reference X-direction row, wherein the transmission signal generation device includes a plurality of signal generating means provided for every group of the transmission piezoelectric elements that are arranged at the same position in the X-direction, and wherein the driving voltage signals from a common signal generating means are supplied to the group of the transmission piezoelectric elements that are arranged at the same position in the X-direction.

18. An ultrasonic phased array sensor comprising:

an ultrasonic transducer array including a rigid support plate that has a first surface on one side and a second surface on the other side in a thickness direction, the rigid support plate being provided with a through-hole group including a plurality of through-holes penetrating between the first and second surfaces, a flexible resin film that is fixed to the first surface of the support plate in such a way as to cover the plurality of through-holes, and a plurality of piezoelectric elements whose number is same as a number of the plurality of through-holes, the piezoelectric element being fixed to the flexible resin film in such a way that a middle portion thereof overlaps, in a plan view, the corresponding through-hole and a peripheral portion thereof overlaps, in a plan view, the first surface of the support plate, wherein the through-hole group has an X-direction row formed by m (m is an integer of 3 or higher) pieces of the through-holes that are arranged at a predetermined X-direction array pitch in an X-direction in an X-Y plane of the support plate, wherein the plurality of piezoelectric elements include a plurality of transmission piezoelectric elements forming transmission transducers that generate ultrasonic waves in response to application of a driving voltage signal having a predetermined driving frequency and a single reception piezoelectric element forming a reception transducer that generates a reception voltage signal in response to a reception of ultrasonic waves;

a transmission signal generation device that generates sine burst wave driving voltage signals for applying the plurality of transmission piezoelectric elements at delay times respectively corresponding to the plurality of transmission piezoelectric elements, the driving voltage signal having the predetermined driving frequency lower than a resonance frequency of the transmission transducer;

a detector that generates a detecting signal with a width corresponding to a duration of the reception voltage signal generated by the reception piezoelectric element;

a control device that performs control with respect to the transmission signal generation device; and a detection device that identifies a position of an obstacle on the basis of a time difference between a transmission timing signal based on the driving voltage signal sent from the control device and a reception timing signal based on the detecting signal sent from the detector, and an azimuth angle sent from the control device, wherein the transmission transducer is of a non-resonant type that generates an ultrasonic wave without performing resonant vibration in response to application of the driving voltage signal having the driving frequency, and the reception transducer is of a resonant type that performs resonant vibration in response to receipt of an ultrasonic wave having a frequency corresponding to the driving frequency.

* * * * *